(12) United States Patent
Strong et al.

(10) Patent No.: US 9,738,338 B2
(45) Date of Patent: Aug. 22, 2017

(54) DUAL TRAILING AXLE SUSPENSION SYSTEM

(71) Applicants: Brooks Strong, Houston, TX (US); Joshua Cayne Fisher, Montgomery, TX (US)

(72) Inventors: Brooks Strong, Houston, TX (US); Joshua Cayne Fisher, Montgomery, TX (US)

( * ) Notice: Subject to any disclaimer, the term of this patent is extended or adjusted under 35 U.S.C. 154(b) by 0 days.

(21) Appl. No.: 14/803,038

(22) Filed: Jul. 18, 2015

(65) Prior Publication Data
US 2017/0015165 A1   Jan. 19, 2017

(51) Int. Cl.
*B62D 61/12* (2006.01)

(52) U.S. Cl.
CPC .......... *B62D 61/12* (2013.01); *B62D 61/125* (2013.01); *B60G 2204/47* (2013.01); *B60G 2300/402* (2013.01)

(58) Field of Classification Search
CPC .. B62D 61/12; B62D 61/125; B60G 2204/47; B60G 2204/4702; B60G 2300/402; B60G 5/00
USPC ............................. 280/86.5; 180/24.02, 209
See application file for complete search history.

(56) References Cited

U.S. PATENT DOCUMENTS

| | | | | |
|---|---|---|---|---|
| 3,640,578 A * | 2/1972 | Finney | ................. | B60G 17/005 298/17 S |
| 3,706,464 A * | 12/1972 | Burrows | ............ | B62D 53/0821 280/401 |
| 4,063,779 A * | 12/1977 | Martin | ................. | B62D 61/125 180/24.02 |
| 4,335,898 A * | 6/1982 | Orosz | ..................... | B60P 3/062 180/24.02 |
| 4,350,358 A * | 9/1982 | Ferris | ................... | B62D 61/125 180/24.01 |
| 5,407,251 A * | 4/1995 | Ritchie, II | ............... | B60G 9/02 280/43.23 |
| 5,458,355 A * | 10/1995 | Young | .................... | B62D 61/12 180/24.02 |
| 5,494,309 A * | 2/1996 | Roy | ..................... | B62D 53/067 280/401 |
| 5,823,629 A * | 10/1998 | Smith | ..................... | B60G 9/02 180/209 |
| 6,050,578 A * | 4/2000 | Beck | ..................... | B62D 53/067 280/404 |
| 6,189,901 B1 * | 2/2001 | Smith | ..................... | B60G 9/00 180/209 |

(Continued)

*Primary Examiner* — Laura Freedman

(57) ABSTRACT

A dual trailing axle suspension system is disclosed wherein a pair of trailing axles are suspended from an auxiliary chassis with axle suspensions that provide spring action for isolating road-induced axle movement from the auxiliary chassis. And the auxiliary chassis is suspended from a chassis of a motor vehicle by an auxiliary chassis suspension adapted to deploy the auxiliary chassis from a stowed location on the motor vehicle to a deployed location at a substantial distance behind the motor vehicle chassis. And the auxiliary chassis suspension is adapted to cause the auxiliary chassis to help support the motor vehicle chassis to a variable degree by acting on the auxiliary chassis at a location between the two axles and in a manner determined by whether the spring action provided by the axle suspensions is set or variable.

21 Claims, 16 Drawing Sheets

(56) References Cited

U.S. PATENT DOCUMENTS

| | | | | |
|---|---|---|---|---|
| 6,247,712 | B1* | 6/2001 | Smith | B62D 61/12 |
| | | | | 180/209 |
| 7,731,208 | B2* | 6/2010 | Strong | B62D 61/12 |
| | | | | 180/209 |
| 7,740,252 | B2* | 6/2010 | Strong | B62D 61/12 |
| | | | | 280/86.5 |
| 7,775,308 | B2* | 8/2010 | Strong | B62D 61/12 |
| | | | | 180/209 |
| 7,775,533 | B2* | 8/2010 | Strong | B60T 13/683 |
| | | | | 180/24.02 |
| 7,845,668 | B2* | 12/2010 | Bergeron | B60P 3/07 |
| | | | | 280/405.1 |
| 8,118,532 | B2* | 2/2012 | Phillips | B60L 11/18 |
| | | | | 414/435 |
| 8,485,538 | B1* | 7/2013 | Strong | B62D 61/12 |
| | | | | 180/209 |
| 8,523,202 | B1* | 9/2013 | Strong | B62D 61/12 |
| | | | | 180/209 |
| 8,523,203 | B1* | 9/2013 | Strong | B62D 61/12 |
| | | | | 180/24.02 |

* cited by examiner

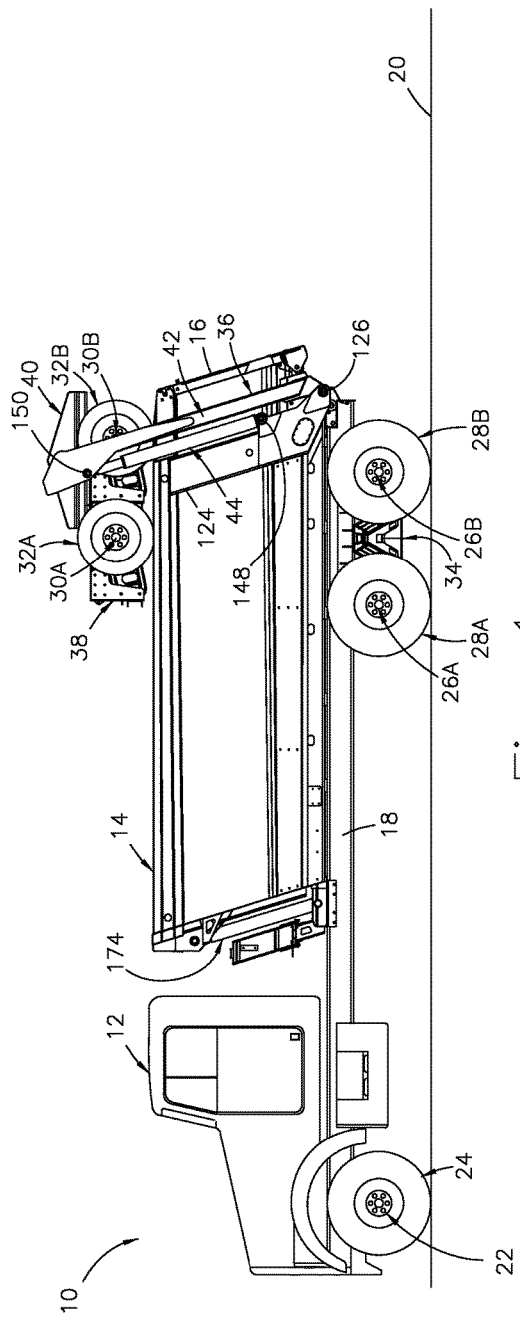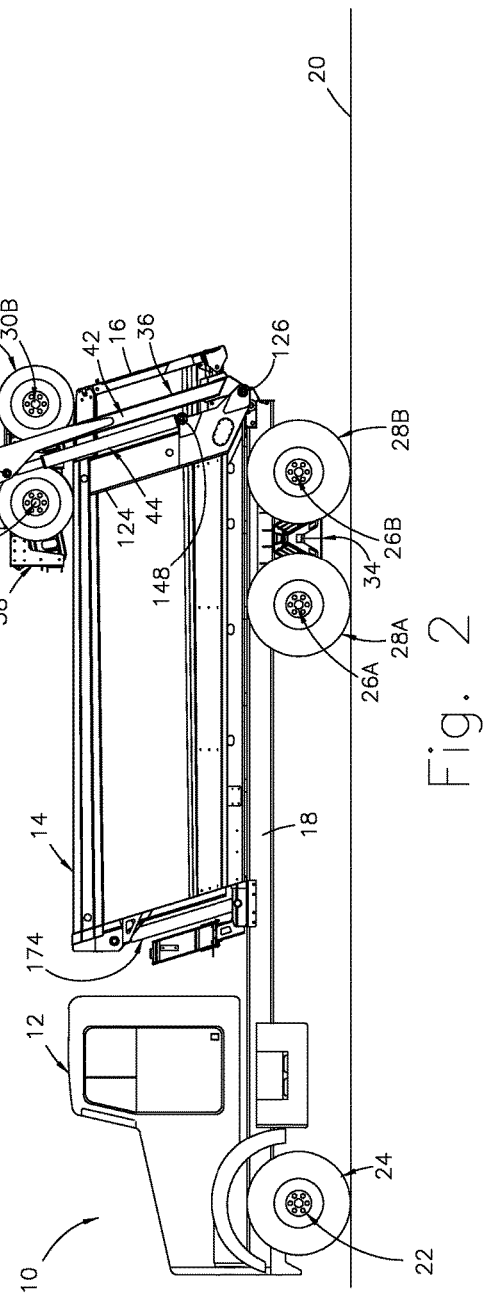

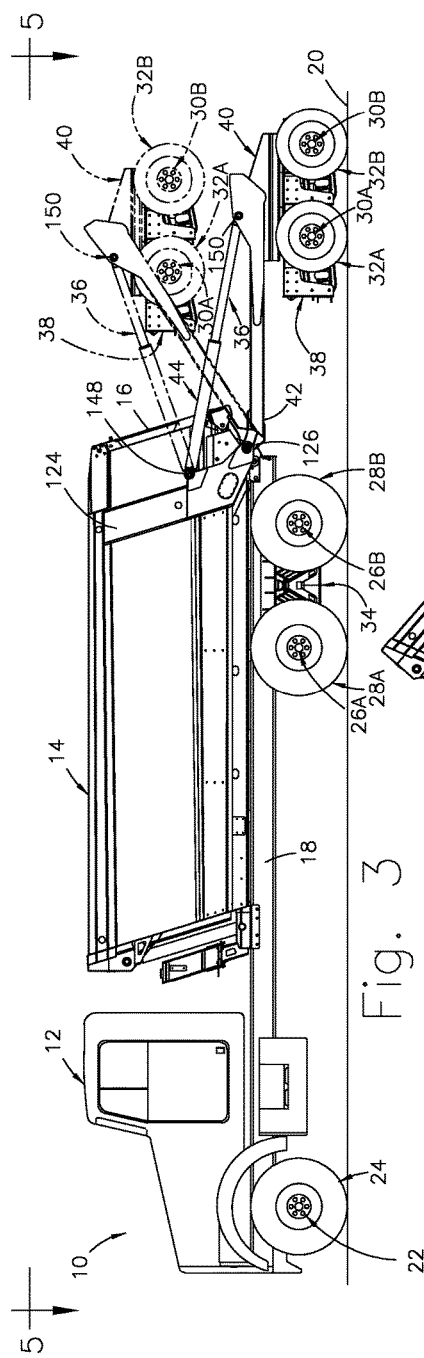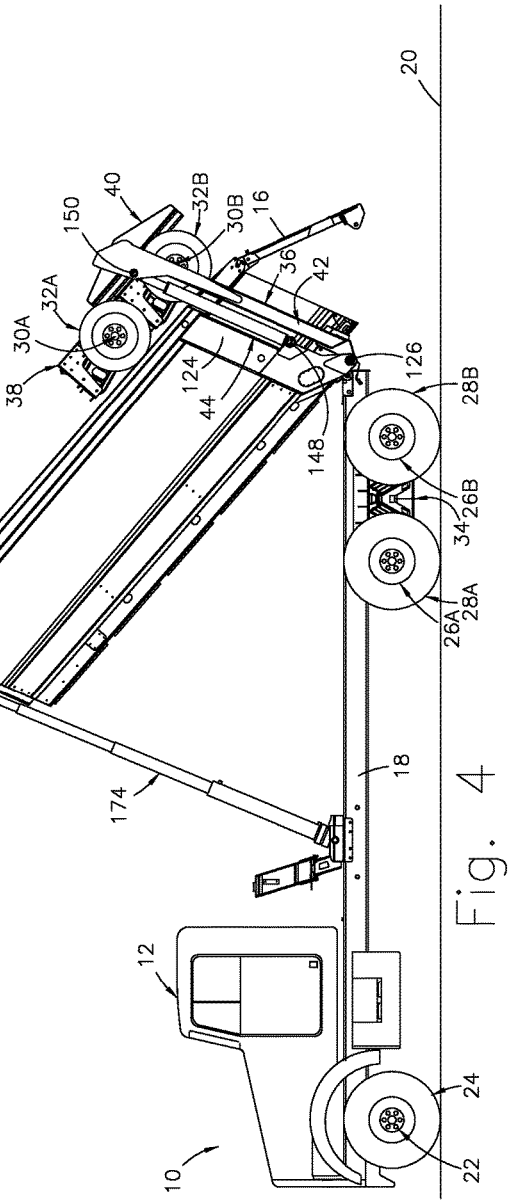

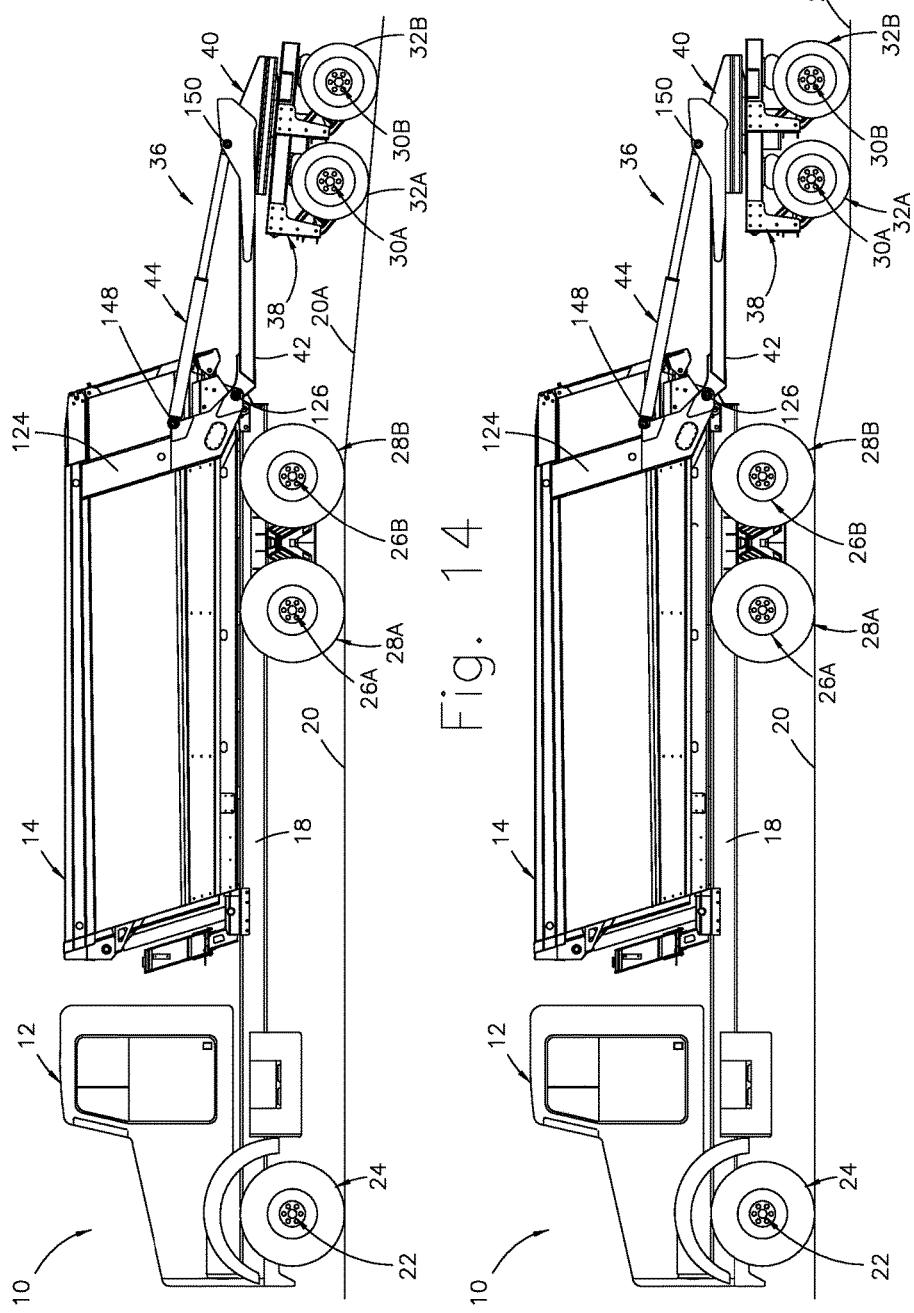

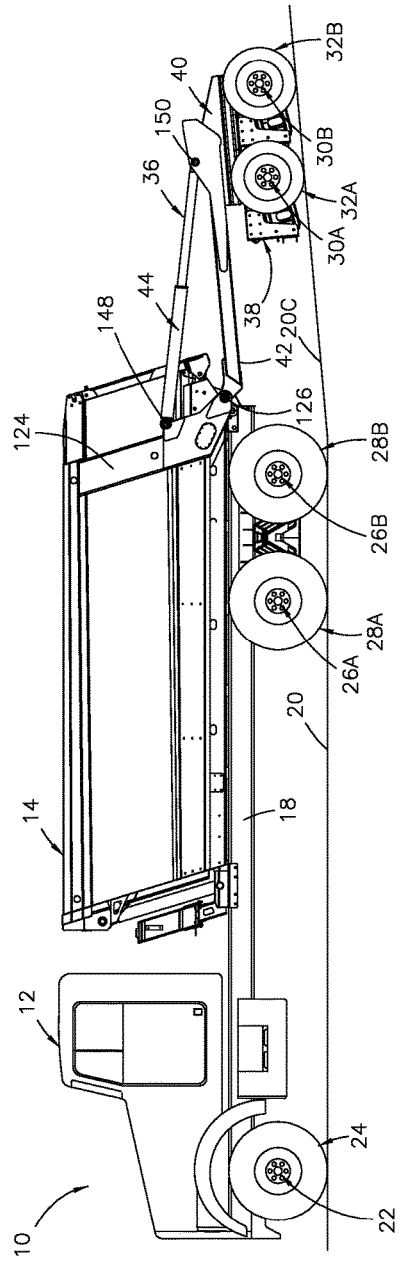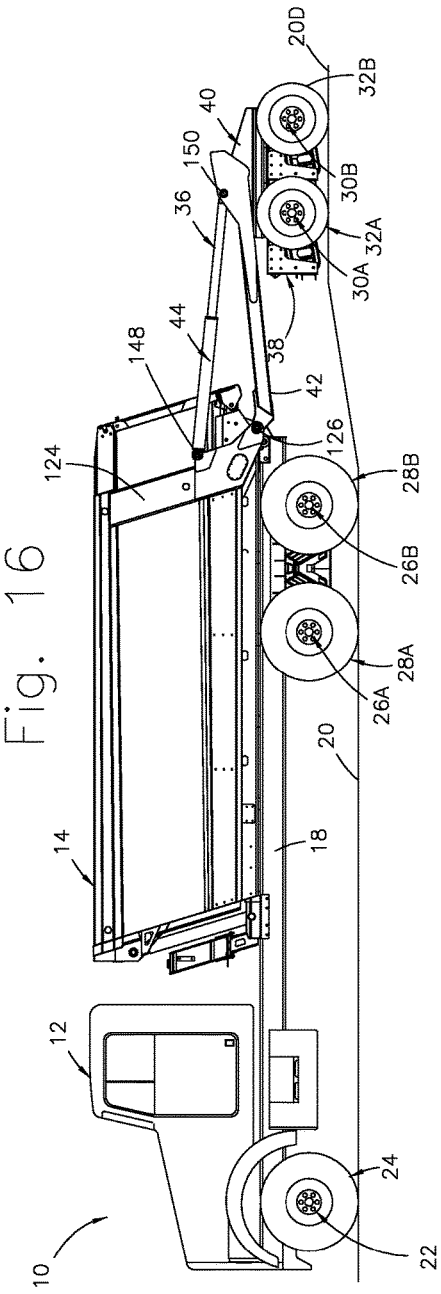

DUAL TRAILING AXLE SUSPENSION SYSTEM

TECHNICAL FIELD

This invention relates to auxiliary axle suspension systems for motor vehicles and more particularly to trailing axle suspension systems and is related to U.S. patent application Ser. No. 14/803,041 entitled "TRAILER HITCH", U.S. patent application Ser. No. 14/803,045 entitled "AUTOMATIC AUXILIARY AXLE CONTROL SYSTEM", and U.S. patent application Ser. No. 14/803,048 entitled "AXLE LOAD MONITORING SYSTEM".

BACKGROUND OF THE INVENTION

Motor vehicles such as dump trucks, refuse trucks, transit concrete mixing trucks, open-bed trucks, utility trucks, military trucks and other vehicles of various types to which a significant load may be added for transport are limited in their load transporting ability by various factors. Such as the weight bearing capacity of their supporting axles and applicable federal and state law. With such laws for example limiting the gross vehicle weight to 80,000 pounds, the weight carried by a single axle to 20,000 pounds and there being an exception as to consecutive axles that limits them to carrying a prescribed combined weight depending on their number and spacing. For example, the combined axle carrying weight is limited to 34,000 pounds in regard to the two powered tandem axles that are typically employed with heavy duty load-transporting motor vehicles. And with such factors as a result impacting the use of such motor vehicles in that the more weight the vehicle can transport at a time, the more useful the vehicle can be provided other factors that impact the ability of the vehicle to perform in an acceptable manner are also taken into account. With such factors including the axle manufacturers rated load capacity.

And in regard to such motor vehicles where it is desired to increase their load carrying capacity within the prescribed limits, it is common practice to provide one or more auxiliary axles that are deployed on command to help support the motor vehicle and thereby reduce the weight carried by the axles that normally support the vehicle. Wherein the axles that normally support the vehicle are then referred to as primary axles and include at least one axle with steerable wheels and one or more powered axles with wheels. And the auxiliary axles are referred to as either a pusher axle, tag axle or trailing axle in distinguishing between where and how they are employed to help support the motor vehicle. Wherein a pusher axle is suspended from the motor vehicle chassis in a location to operate between a forwardly-located primary axle with steerable wheels under the control of the vehicle operator and one or more rearwardly-located primary axles with powered wheels. Whereas a tag axle is suspended from the motor vehicle chassis to operate rearward of one or more primary axles with powered wheels but not normally at any substantial distance behind the motor vehicle chassis. And a trailing axle (that has also been referred to as a tag axle and trailing tag axle) is also suspended from the motor vehicle chassis but in a manner to operate at a substantial distance rearward of the motor vehicle chassis.

And in considering the use of such auxiliary axles, their individual weight bearing capacity and their number available in being suitably applied to a particular motor vehicle limits their ability to provide the vehicle support desired. And in the case of trailing axles, their number has been limited for the lack of a suitable suspension system that can accommodate more than one to operate in a satisfactory manner at a substantial distance behind the motor vehicle chassis.

SUMMARY OF THE INVENTION

The present invention resides in a dual trailing axle suspension system wherein a pair of axles that serve as trailing axles are directly suspended from an auxiliary chassis with axle suspensions that provide spring action for isolating road induced axle movement from the auxiliary chassis. And the auxiliary chassis is suspended from a chassis of a motor vehicle by an auxiliary chassis suspension adapted to deploy the auxiliary chassis from a stowed location on the motor vehicle to a deployed location at a substantial distance behind the motor vehicle chassis. And the auxiliary chassis suspension is adapted to then cause the auxiliary chassis to help support the motor vehicle chassis to a variable degree by acting on the auxiliary chassis at a location substantially midway between the two axles in a manner determined by whether the spring action provided by the axle suspensions is set or variable.

These and other features of the invention are disclosed in the accompanying drawings and description of exemplary embodiments.

DESCRIPTION OF THE DRAWINGS

FIG. 1 is a side view of a dump truck employing a dual trailing suspension system according to the present invention wherein the two trailing axles are suspended with air spring suspensions and the trailing axles are shown in their stowed condition on the truck.

FIG. 2 is a side view of the dump truck wherein the trailing axles are shown positioned for deployment from their stowed condition.

FIG. 3 is a side view of the dump truck wherein the trailing axles are shown in phantom lines while being deployed from their stowed condition and then established in their deployed condition shown in solid lines.

FIG. 4 is a side view of the dump truck with the trailing axles in their stowed condition on the dump body of the truck and with the dump body tilted and the tailgate of the dump body open for dumping a load.

FIGS. 14-17 are side views of the dump truck with the trailing axles deployed and while the trailing axles are traveling on sections of a road surfaces at elevations different from that being traveled by the primary axles supporting the truck.

DESCRIPTION OF EXEMPLARY EMBODIMENTS

Figure 5:
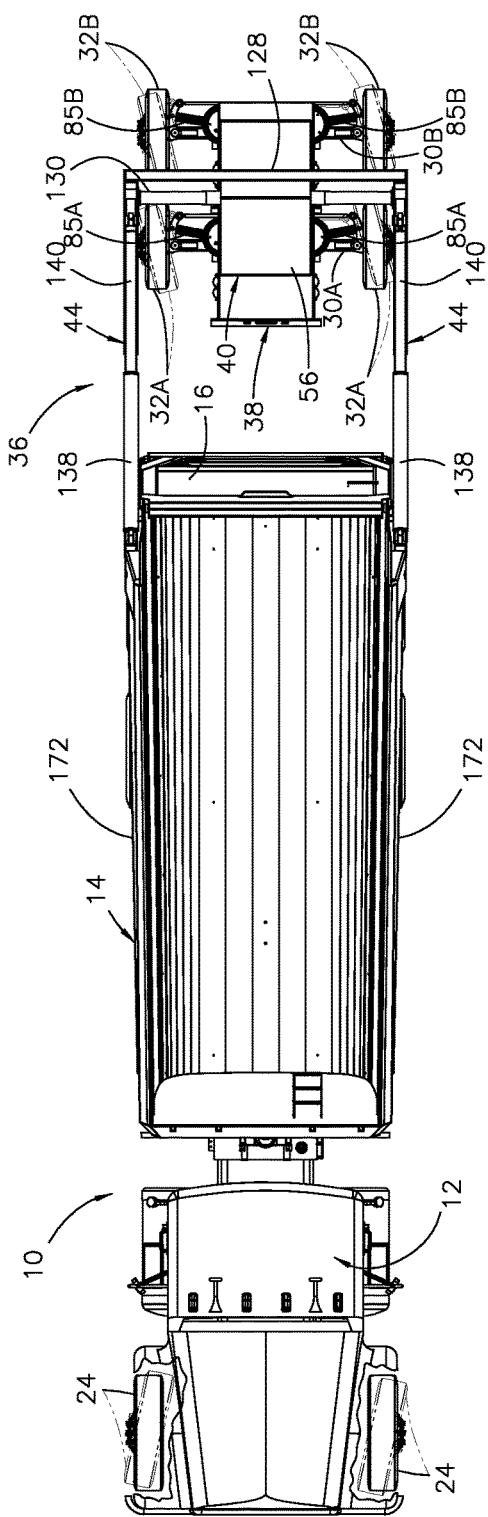
FIG. 5 is view taken along the lines 5-5 in FIG. 3 when looking in the direction of the arrows.

The present invention is shown as applied to a dedicated load-carrying motor vehicle in the form of a dump truck 10 having a cab 12 that serves as a vehicle operator and passenger compartment and a tiltable dump body 14 that serves as a load container and has a latchable top-hinged tail gate 16 for releasing a load when the dump body is tilted. With the cab 12 and tiltable dump body 14 mounted on a chassis 18 in a conventional manner and the truck chassis in turn supported on a road surface 20 by both primary axles and deployable auxiliary axles that are available to help support the truck chassis. With the primary axles consisting of a forwardly-located front axle 22 with steerable wheels 24 at its outboard ends under the control of the vehicle operator and rearwardly-located powered tandem axles 26A and 26B with dual wheels 28A and 28B respectively at their outboard ends. And with the auxiliary axles comprising a pair of trailing axles 30A and 30B with wheels 32A and 32B respectively at their outboard ends.

Wherein the front axle 22 and powered tandem axles 26A and 26B are suspended in parallel relationship from laterally-spaced locations on the truck chassis 18. With the front axle 22 located under a front end portion of the truck chassis and the powered tandem axles 26A and 26B located under a rear end potion of the truck chassis and dump body 14. And with the tandem axles 26A and 26B and thus their wheels 28A and 28B powered by a power train of a suitable conventional type that includes an engine and transmission (not shown) that are controlled from the cab by the vehicle operator. And wherein the suspension systems suspending the primary axles from the Muck chassis 18 are of a conventional type and of which only a portion of the tandem axles' suspension system 34 is shown and is of the rocking-beam type.

Figure 6:
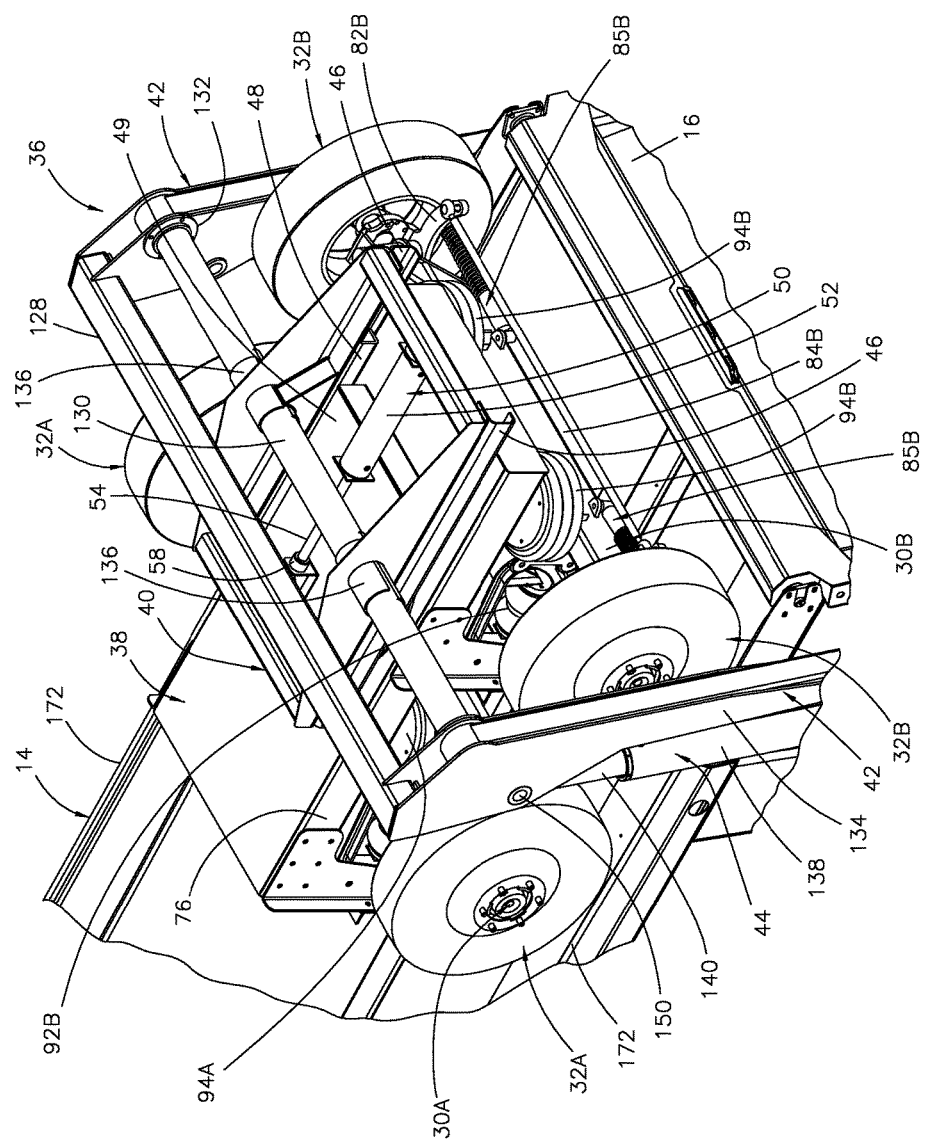
FIG. 6 is a perspective view of a portion of the dual trailing axle suspension system with the trailing axles in their stowed condition on the dump body.
Figure 7:
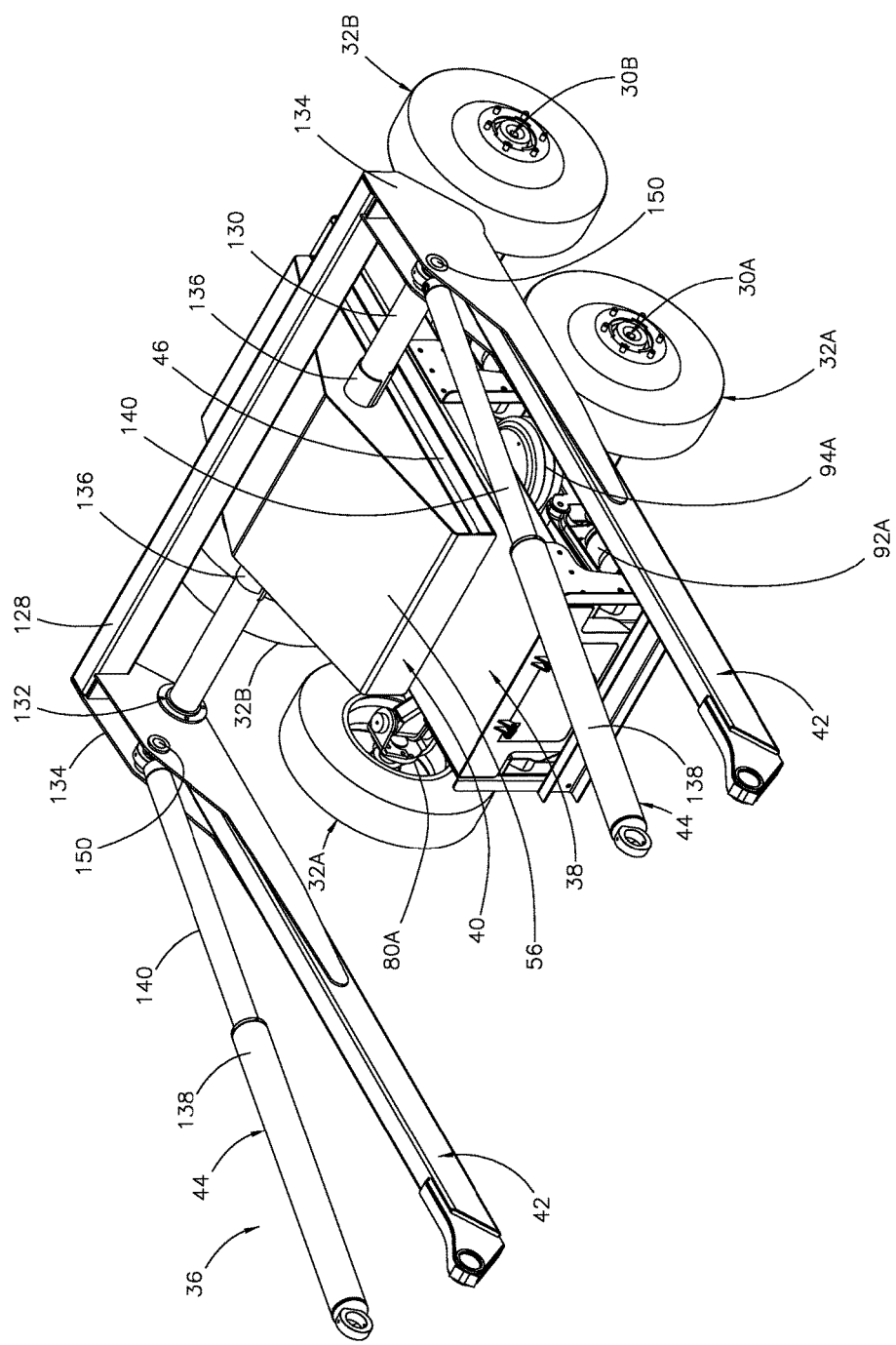
FIG. 7 is a perspective view of the dual trailing axle suspension system.
Figure 8:
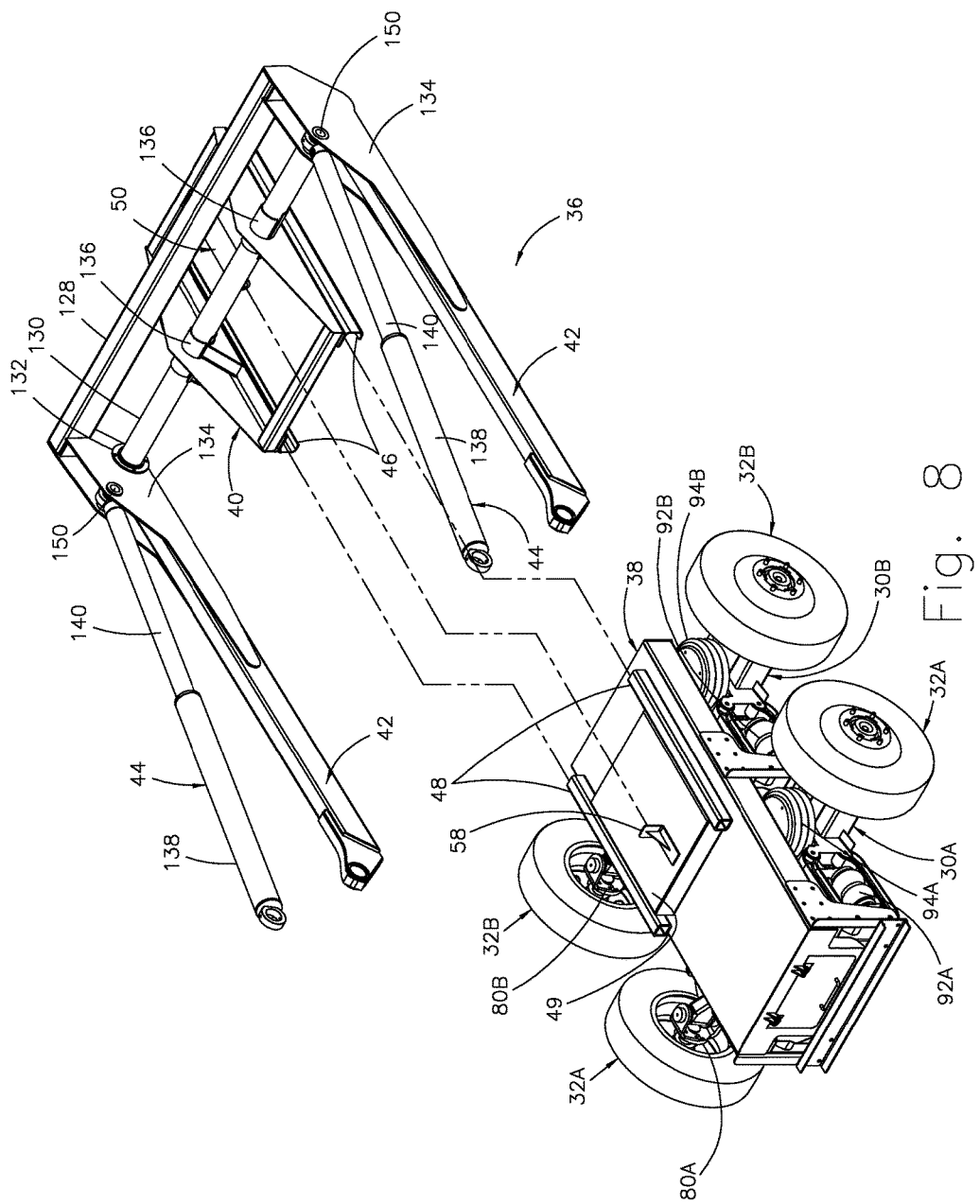
FIG. 8 is a partially-exploded perspective view of the dual trailing axle suspension system.
Figure 9:
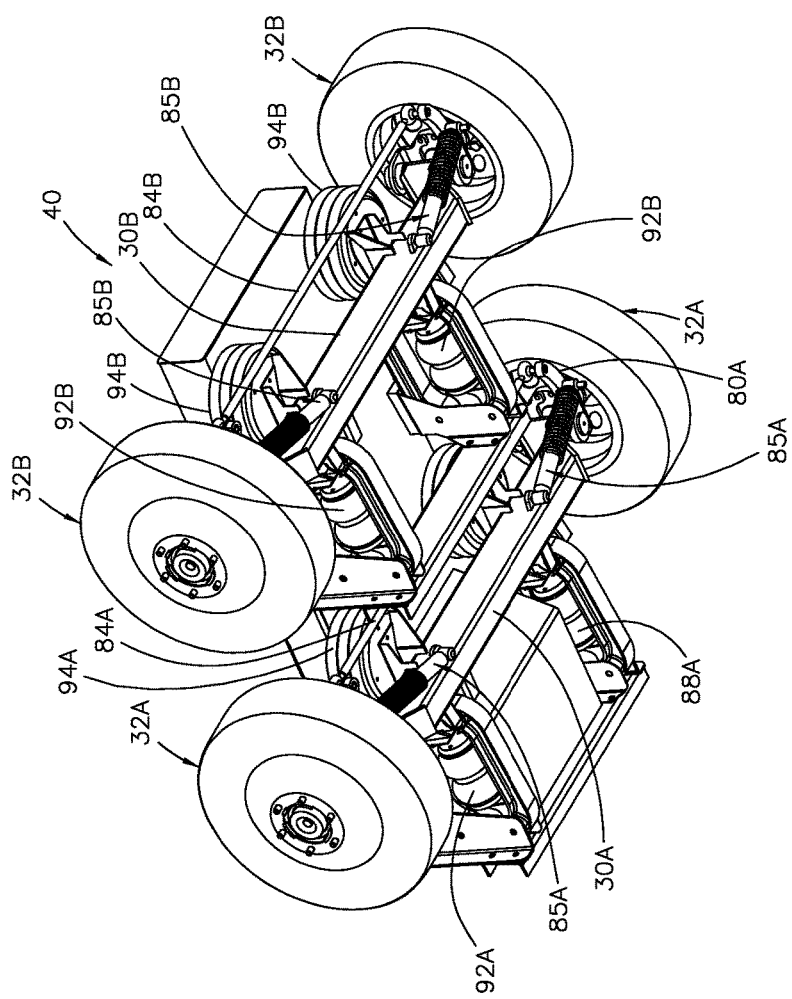
FIG. 9 is a perspective view of the underside of the trailing axle suspensions.
Figure 10:
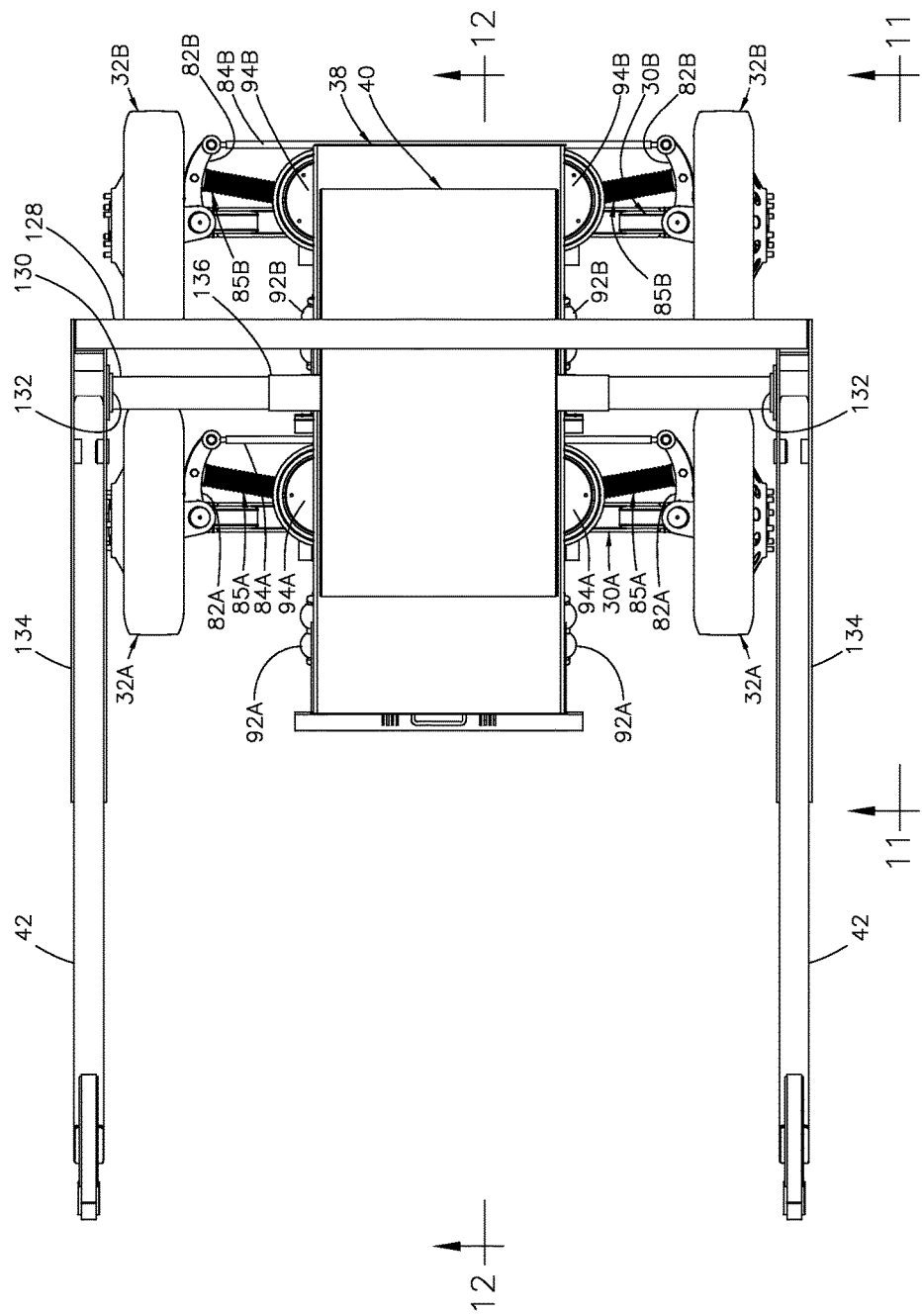
FIG. 10 is an enlarged overhead view of the dual trailing axle suspension system.

Turning now to the trailing axles 30A and 30B, they are suspended from the dump body 14 and thereby from the truck chassis 18 by a dual trailing axle suspension system 36 according to the present invention as adapted to the dump truck and generally comprising an auxiliary chassis 38 from which the trailing axles 30A and 30B are directly suspended, a carriage 40, a pair of suspension arms 42, and a pair of hydraulically-operated actuators 44. Wherein the auxiliary chassis 38 for clearance purposes with respect to the tailgate 16 when stowing and deploying the trailing axles 30A and 30B as descried later is slidably guided and retained on the underside of the carriage 40 by a pair of straight parallel guide rails 46 of U-channel shape that are rigidly fixed to the bottom side of the carriage 40 and slidably receive straight parallel guide members 48 of square tubular shape that are rigidly fixed to a box 49 of rectangular shape that is rigidly fixed to the upper side of the auxiliary chassis 38. See FIGS. 6-8, 11 and 12. And wherein the auxiliary chassis 38 is positioned under the carriage 40 with the guidance of the guide rails 46 and guide members 48 by a pneumatically-operated actuator 50 comprising a cylinder 52 and piston-operated rod 54 as shown in FIGS. 6 and 8 with the top part 56 of the carriage removed. And wherein the cylinder 52 is fixed to the carriage 40 and the piston rod 54 is connected at its operating end with a bracket 58 to the upper side of the rectangular box 49 and thereby to the auxiliary chassis 38.

Figure 12:
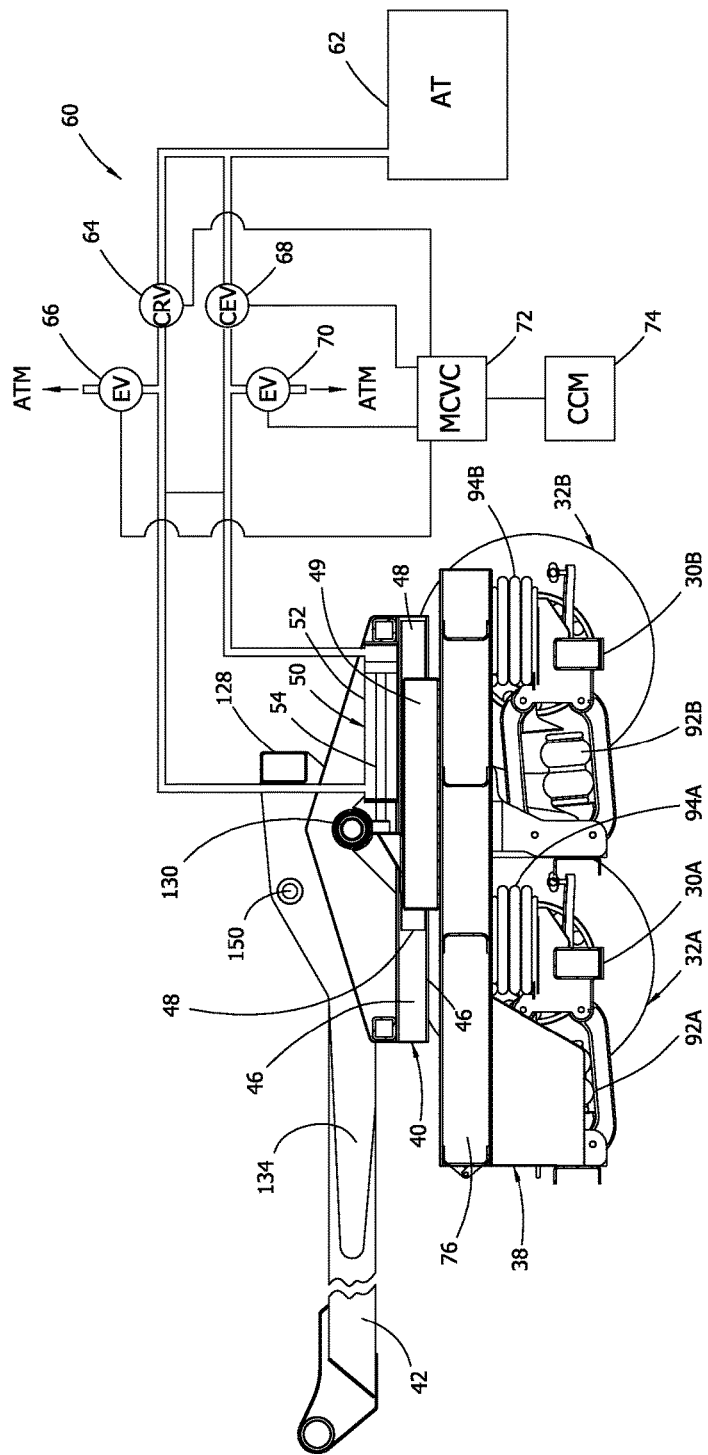
FIG. 12 is an enlarged view taken along the lines 12-12 in FIG. 10 when looking in the direction of the arrows and includes a schematic of the control system controlling the positioning of the auxiliary chassis with respect to a carriage employed in the dual trailing axle suspension system.

Referring to FIG. 12, the operation of the actuator 50 is controlled by a pneumatic circuit 60 that along with other pneumatically-operated components in the dual trailing axle suspension system later described is supplied by an air tank (AT) 62. And wherein air is supplied to the air tank 62 according to demand by an engine-driven air compressor (not shown) and maintained at a regulated pressure in a conventional manner suited to meet the needs of the dual trailing axle suspension system as well as other pneumatically-operated vehicle components such as air brakes. And for the operation of the actuator 50, there is provided a chassis-retracting valve (CRV) 64, an exhaust valve (EV) 66, a chassis-extending valve (CEV) 68, an exhaust valve (EV) 70, and a master control valve center (MCVC) 72 that operates these valves under the command of the vehicle operator from a central command module (CCM) 74 located in the cab 12. Wherein the above valves are of a conventional electronically-operated type with the exhaust valve 66 when opened exhausting the air pressure downstream of the chassis-retracting valve (CRV) 64 to the atmosphere (ATM) and the exhaust valve 70 when opened exhausting the air pressure downstream of the chassis-extending valve (CEV) 68 to the atmosphere (ATM).

And with the chassis-retracting valve (CRV) 64 opened and the exhaust valve (EV) 66 closed and the chassis-extending valve (CEV) 68 closed and the exhaust valve (EV) 70 opened by the MCVC 72 under vehicle operator control at the CCM 74, the auxiliary chassis 38 is positioned relative to the carriage 40 by the actuator 50 in a fully-retracted position as shown in FIG. 2 for deployment of the trailing axles 26A and 26B from the stowed condition as further described later. And with the chassis-extending valve (CEV) 68 and exhaust valve (EV) 66 opened and the chassis-retracting valve (CRV) 64 and exhaust valve (EV) 70 closed by the MCVC 72 under operator control at the CCM 74, the auxiliary chassis 38 is positioned relative to the carriage 40 by the actuator 50 in a fully-extended position as shown in FIGS. 1 and 4 such that the rear-most trailing axle wheels 32B are clear of the operation of the tail gate 16 as further describer later.

Continuing on with the trailing axles 30A and 30B, they are separately directly suspended in parallel relationship at laterally-spaced locations from the frame 76 of the auxiliary chassis 38 by matching axle suspensions 78A and 78B respectively. And the trailing axle wheels 32A and 32B are mounted on the ends of the trailing axles 30A and 30B with steering knuckles 80A and 80B respectively that establish the wheels with a suitable positive caster angle and have steering arms 82A and 82B that are connected by tie rods 84A and 84B respectively that provide the wheels with a suitable toe-in and with the thus interconnected trailing axle wheels stabilized and returned to a normal condition by coil spring/shock absorber assemblies 85A and 85B like that in U.S. Pat. No. 7,775,308 following forced steerage in reaction to the steered turning movement of the truck. Whereby the trailing axle wheels 32A and 32B with the trailing axles deployed in their active condition are enabled to align with forward and rearward truck movement as shown in solid lines in FIG. 5 and self-steer in the direction of forward and reverse turning movement of the truck as shown in phantom lines in FIG. 5. In addition, it will be observed that the arrangement of the trailing axles 30A and 30B locates their respective wheels 32A and 32B in alignment with the sides of the dump body 14 as shown in FIG. 5 so that the trailing axle wheels can thereby track and provide for firmly stowing of the auxiliary chassis 38 with the trailing axles 30A and 30B on top of the dump body sides as shown in FIGS. 1, 4 and 6 and further described later.

Continuing on with the separate axle suspensions 78A and 78B, they each comprise a pair of parallel arms 86A and 86B of equal length that are pivotally connected at one end by pivot pins 88A and 88B to the auxiliary chassis frame 76 and pivotally connected at the other end by pivot pins 90A and 90B to the respective trailing axles 30A and 30B inboard of the steering knuckle at this end of the axles. See FIG. 11. And for controlling movement of the thus suspended trailing axles 30A and 30B, there is provided a matching pair of pneumatically-operated actuators 92A and 92B of the elastomeric-bag type and a matching pair of air springs 94A and 9413 that are also of the elastomeric-bag type. Wherein the actuators 92A and 92B are pivotally connected at one end to the auxiliary chassis frame 76 with the lower pivot pins 88A and 88B inward of and adjacent the pivotal connection of the lower suspension arms 86A and 86B respectively with the auxiliary chassis frame and are pivotally connected at their other end to the trailing axles 30A and 30B with the upper pivot pins 90A and 90B inward of and adjacent the pivotal connection of the upper suspension arms 86A and 86B respectively with the respective trailing axles. Whereby the actuators 92A and 92B act in an angular manner between the auxiliary chassis 38 and the trailing axles 30A and 30B in effecting axle movement for stowage. Whereas the air springs 94A and 94B are mounted to act in a substantially upright manner between the respective trailing axles 30A and 30B and the auxiliary chassis 38 in providing spring action isolating road induced axle movement from the auxiliary chassis. And the actuators 92A and 92B when supplied with air pressure while the air springs 94A and 94B are exhausted of air pressure raise and thereby stow the trailing axles 30A and 30B with respect to the auxiliary chassis 38 as shown in solid lines in FIG. 11. And the air springs 94A and 94B when supplied with a controllable air pressure while the actuators 92A and 92B are exhausted of air pressure lower and thereby deploy the trailing axles 30A and 30B with respect to the auxiliary chassis 38 and establish the trailing axles in a fully deployed active condition as shown in phantom lines in FIG. 11.

Figure 11:
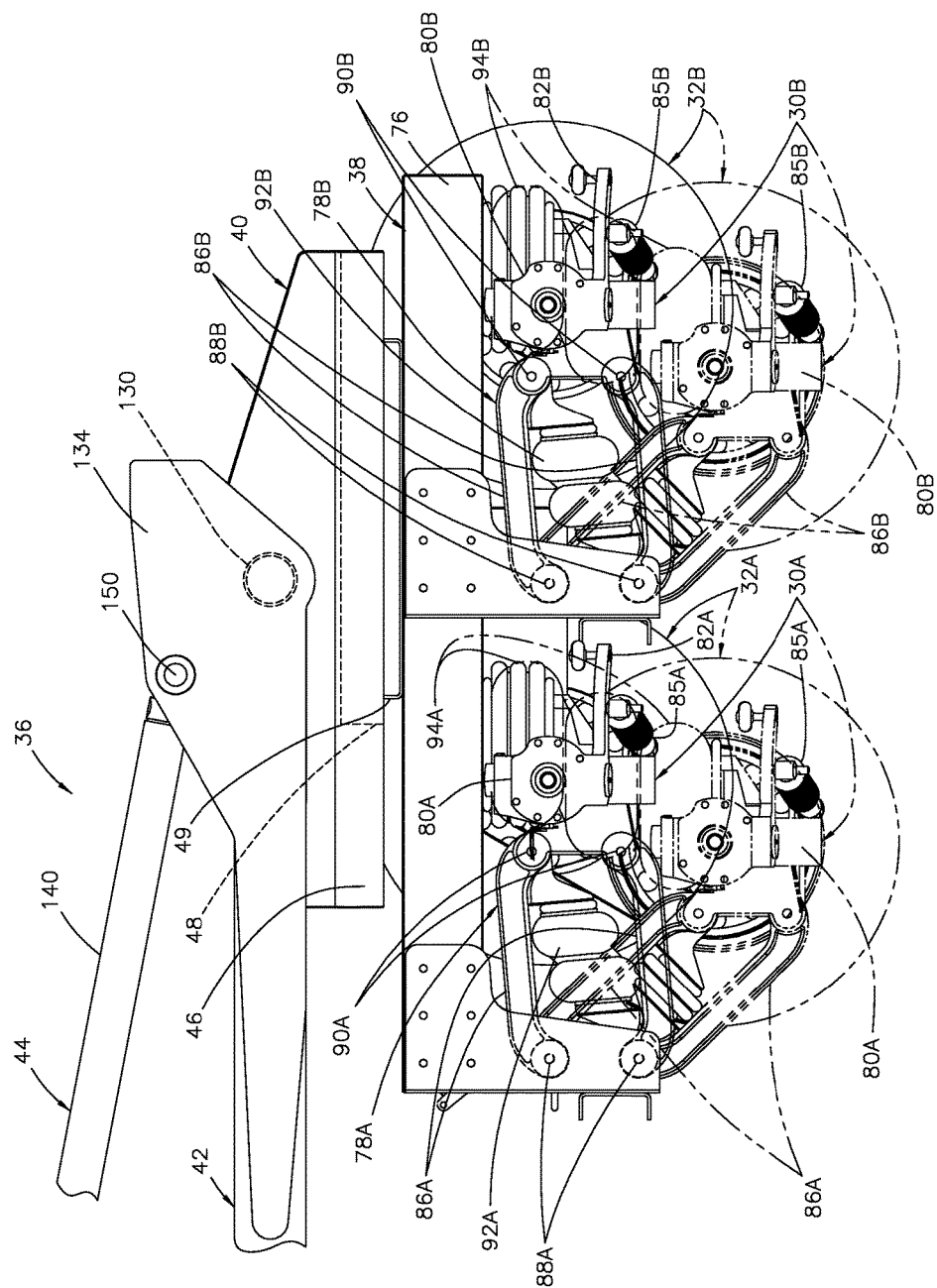
FIG. 11 is an enlarged view taken along the lines 11-11 in FIG. 10 with certain near side components absent and with the trailing axles shown in their stowed condition in solid lines and in their fully deployed condition in phantom lines with respect to an auxiliary chassis from which the trailing axles are directly suspended.
Figure 13:
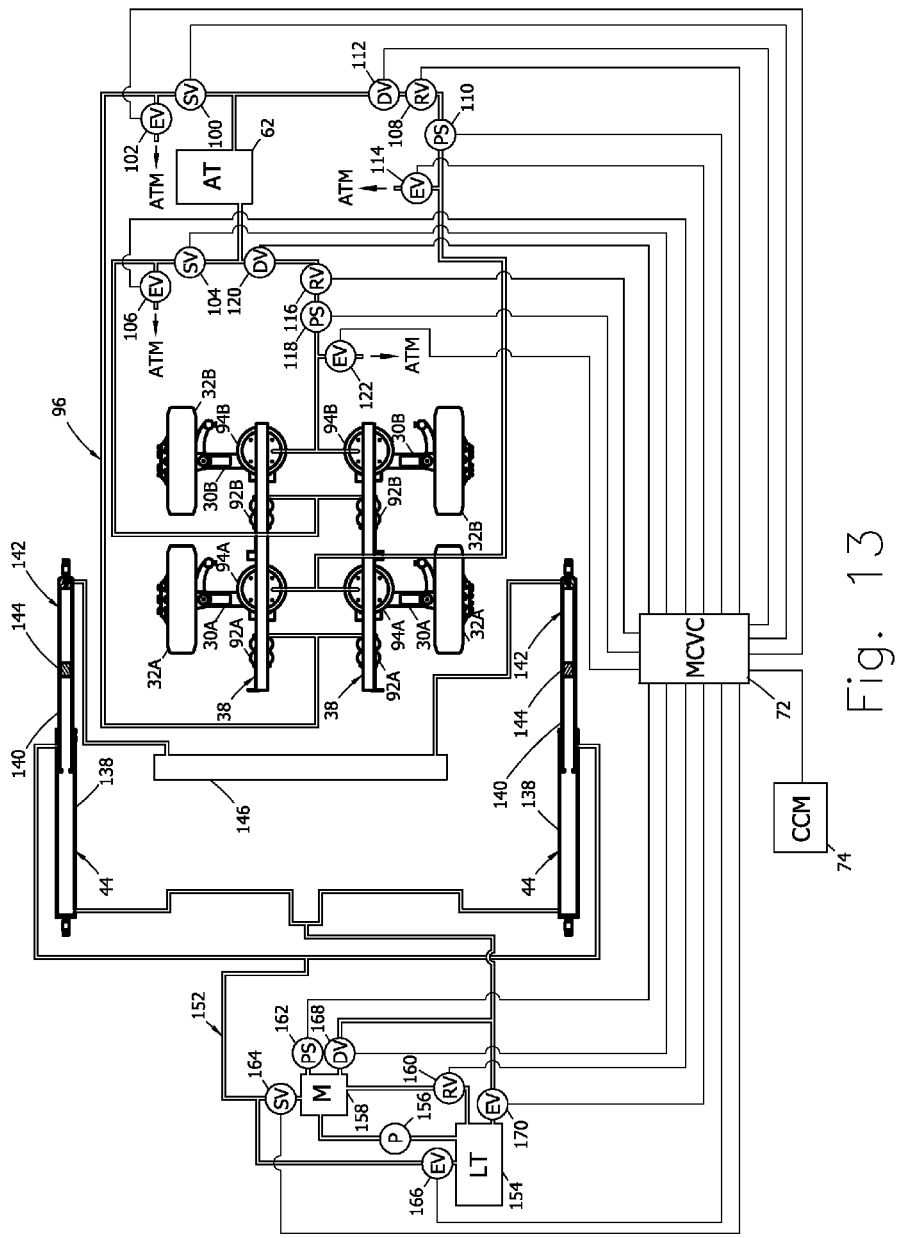
FIG. 13 is a schematic of the control system controlling the dual trailing axle suspension system apart from that provided by the control system in FIG. 12.

Referring now to FIG. 13, the operation of the pneumatically-operated actuators 92A and 92B and air springs 94A and 94B is controlled by a pneumatic circuit 96 that is supplied by the air tank (AT) 62. And for the operation of the actuators 92A separate from the actuators 92B, there is provided an axle stowing/raising valve (SV) 100 and exhaust valve (EV) 102 that provide for pressurizing the actuators 92A with tank pressure and thereby raising the trailing axle 30A to its stowed position with respect to the auxiliary chassis 38 shown in solid lines in FIG. 11 provided the air springs 94A are not pressurized. With the axle stowing/raising valve (SV) 100 and exhaust valve (EV) 102 also providing for exhausting the actuators 92A of air pressure to allow unimpeded action by the air springs 94A to deploy the trailing axle 30A from the auxiliary chassis 38 when they are pressurized. And for the operation of the actuators 92B separate from the actuators 92A, there is provided an axle stowing/raising valve (SV) 104 and exhaust valve (EV) 106 that provide for pressurizing the actuators 92B with tank pressure and thereby raising the trailing axle 30B to its stowed position with respect to the auxiliary chassis 38 shown in solid lines in FIG. 11 provided the air springs 94B are not pressurized. With the axle stowing/raising valve (SV) 104 and exhaust valve (EV) 106 also providing for exhausting the actuators 92B of air pressure to allow unimpeded action of the air springs 94B to deploy the trailing axle 30B from the auxiliary chassis 38 when they are pressurized.

And for the operation of the air springs 94A separate from the air springs 94B, there is provided a regulator valve (RV) 108 for regulating the air pressure supplied to the air springs 94A, a pressure sensor (PS) 110 that senses the regulated air pressure and provides feedback for controlling the operation of the regulator valve (RV) 108 in providing the desired pressure for the functioning of the air springs 94A and indication of the pressure presently acting in the air springs 94A, an axle deploying/lowering valve (DV) 112 and associated exhaust valve (EV) 114 that provide for establishing this air pressure in the air springs 94A and thereby deploying/lowering the trailing axle 30A with respect to the auxiliary chassis 38 using the pressure determined by the pressure regulator valve (RV) 108. With the exhaust valve (EV) 114 also providing for exhausting the air springs 94A of pressure to allow the pneumatically-operated actuators 92A when pressurized to forcibly raise the trailing axle 30A to its stowed position with respect to the auxiliary chassis 38 as shown in solid lines in FIG. 11. And for the operation of the air springs 94B separate from the air springs 94A, there is provided a regulator valve (RV) 116 for regulating the air pressure to operate the air springs 94B, a pressure sensor (PS) 118 that senses the regulated air pressure and provides feedback for controlling the operation of the regulator valve (RV) 116 in providing the desired pressure for the functioning of the air springs 94B and indication of the pressure presently acting in the air springs 94B, and an axle deploying/lowering valve (DV) 120 and associated exhaust valve (EV) 122 that provide for establishing this air pressure in the air springs 94B and thereby deploying/lowering the trailing axle 30B with respect to the auxiliary chassis 38. With the exhaust valve (EV) 122 also providing for exhausting the air springs 94B of pressure to allow the pneumatically-operated actuators 92B when pressurized to forcibly raise the trailing axle 30B to its stowed position with respect to the auxiliary chassis 38 as shown in solid lines in FIG. 11.

The valves in the pneumatic circuit 96 are of a conventional electrically-operated type, are interconnected as shown and like the pneumatic circuit 60, the valves are controlled by the MCVC 72 that is under the command of the CCM 74 at the direction of the vehicle operator. And with the regulator valves (RV) 108 and (RV) 116 being operable to regulate the air pressure supplied to the respective air springs 94A and 94B in accordance with controlled voltage input.

Continuing on with the remaining dual trailing axle suspension system components, the carriage 40 and thereby the auxiliary chassis 38 with the trailing axles 30A and 30B are suspended from the dump body 14 and thereby from the truck chassis 18 by the suspension arms 42 and hydraulically-operated actuators 44 that are located to clear the sides of the dump body 14 and arc connected with the truck body 14 and thereby with the truck chassis 18 in a reinforced manner by suspension support members 124 that are fixed to the outboard side of a rear end-portion of the truck body. Describing first the suspension arms 42, they are pivotally connected at one end by a pivot pin 126 to a lower end portion of the respective support members 124 to swing about an axis parallel to the primary axles, are rigidly joined together at their other end by a cross-member 128, and are pivotally connected adjacent the cross-member 128 with the ends of a laterally extending tubular shaft 130 by which the carriage 40 and thereby the auxiliary chassis 38 is supported by the suspension arms 42 for pivotal movement. With such pivotal support being provided by the ends of the shaft 130 being supported with flange bearings 132 that are mounted in a reinforced U-shaped channel portion 134 of the suspension arms 42. See FIGS. 6, 7, 8 and 10.

Completing the connection of the suspension arms 42 with the carriage 40 and thereby the auxiliary chassis 38, the auxiliary chassis supporting shaft 130 is received along a mid-portion thereof by a pair of reinforcing tubular sleeves 136 that are welded to the shaft 130 and to bracing structure of the carriage 40 to thereby provide for rigid support of the auxiliary chassis supporting shaft 130 in a fixed position on the carriage. See FIGS. 6 and 8 with the top part 56 of the carriage 40 removed to expose the interior. And wherein the shaft 130 is located on the carriage 40 parallel to the axis about which the suspensions arms 42 can swing and thus parallel to the primary axles 22, 26A and 26B and thereby locates the trailing axles 30A and 30B parallel with the primary axles while the carriage 40 and thereby the auxiliary chassis 40 are allowed to pivot relative to the suspension arms 42 as further described later. Moreover, the carriage-mounted auxiliary chassis supporting shaft 130 that is acted on by the hydraulically-operated actuators 44 via the suspension arms 42 as further described below is located above and substantially midway between the trailing axles 30A and 30B throughout the range of their movement relative to the auxiliary chassis 38.

Turning now to the hydraulically-operated actuators 44, they are like those in U.S. Pat. No. 7,775,308 wherein they comprise a cylinder 138 and piston 140 and incorporate a gas spring 142. With the gas springs 142 each comprising a piston 144 that is slidably received in the related actuator piston 140 and is acted on at one end by the hydraulic pressure acting on the actuator piston and is acted on at the other end by gas pressure at a prescribed charge pressure that is made available in adequate supply to both gas springs 142 by a gas pressure accumulator tank 146. See FIG. 13. And with the gas preferably being nitrogen for system compatibility and the charge pressure determined for the intended gas spring operation described later.

Continuing on with the employment of the hydraulically-operated actuators 44, their cylinders 138 are pivotally connected at their closed end by a pivot pin 148 to the respective suspension support members 124 at a location above the respective pivotal connections of the suspension arms 42 with these support members. And the actuator pistons 140 are pivotally connected at their operating end within and to the channel portion 134 of the suspension arms 42 by a pivot pin 150 at a relatively short distance from where the suspension arms 42 are pivotally connected with the auxiliary chassis supporting shaft 130 that is fixed to the carriage. Whereby the trailing axles 30A and 30B are also located and maintained by the actuators 44 in parallel relationship with the primary axles 22, 26A and 26B and from a higher location on the suspension support members 124 and thus in a significant trussing manner when the trailing axles are deployed with the actuators 44 extended. Moreover, the trailing axles 30A and 30B are located with their axle suspensions 78A and 78B at opposite sides of the pivotal axis of the carriage 40 and auxiliary chassis 38 provided by the auxiliary chassis supporting shaft 130 when the trailing axles are deployed so that the force provided by the actuators 44 on the shaft 130 is located substantially midway between the trailing axles throughout their range of movement relative to the auxiliary chassis 38 and thereby resists the action of both of the air springs 94A and 94B in a substantially balanced structural manner in causing the auxiliary chassis to help support the truck chassis 18 as further described later. While the actuator gas springs 142 and trailing axle suspension air springs 94A and 94B are available to allow the trailing axles 30A and 30B to adjust to differences in elevation when the trailing axle wheels 32A and 32B are supported by a road surface at one elevation and the primary axle wheels 24, 28A and 28B are supported by the road surface at a different elevation as further described later.

Referring again to FIG. 13, the operation of the hydraulically-operated actuators 44 is provided by a hydraulic circuit 152 comprising a vented liquid tank (LT) 154 containing hydraulic fluid, a hydraulic pump (P) 156 that is supplied with the hydraulic fluid in the tank 154 and operates on demand to deliver the hydraulic fluid to a manifold (M) 158, a controllable hydraulic pressure regulator valve (RV) 160 that returns excess hydraulic fluid at the manifold to the tank in regulating the pressure being supplied for actuator operation, a pressure sensor (PS) 162 that provides feedback for controlling the operation of the regulator valve 160 in providing the desired operating pressure for the actuators 44, an axle-stowing valve (SV) 164 and exhaust valve (EV) 166 providing for actuator retraction, and an axle-deploying valve (DV) 168 and exhaust valve (EV) 170 providing for actuator extension. And wherein the valves in the hydraulic circuit 152 are of a conventional electrically-operated type with the pressure regulator valve 160 being operable to vary the hydraulic pressure supplied to the actuators 44 in accordance with a controlled voltage input. And wherein the components in the hydraulic circuit 152 are interconnected as shown and controlled with the MCVC 72 that is under the command of the CCM 74.

Describing now a typical sequence of vehicle operator directed operation of the dual trailing axle suspension system 36 via the CCM 74 and MCVC 72 and starting with establishing the trailing axles 30A and 30B in their stowed condition shown in FIG. 1, this condition can be established at any time with the pneumatic circuits 60 and 96 and the hydraulic circuit 152. Wherein the trailing axles 30A and 30B are stowed with respect to the auxiliary chassis 38 by the pneumatic circuit 96 by (A) opening the axle-stowing valves (SV) 100 and (SV) 104 and closing the exhaust valves (EV) 102 and (EV) 106 serving the respective pneumatically-operated actuators 92A and 92B, and (13) closing the axle-deploying valves (DV) 112 and (DV) 120 and opening the exhaust valves (EV) 114 and (EV) 122 serving the respective air springs 94A and 94B. And with the trailing axles 30A and 30B thereby stowed with respect to the auxiliary chassis 38 in a tucked compact manner, the auxiliary chassis is located in its retracted condition with respect to the carriage 40 by the pneumatic circuit 60 by (A) opening the chassis-retracting valve (CRV) 64 and exhaust valve (EV) 70, and (B) closing the chassis-extending valve (CEV) 68 and exhaust valve (EV) 66 serving the pneumatically-operated actuator 50. Following the above operations and with the hydraulically-operated actuators 44 for example extended as shown in solid lines in FIG. 3 in fully deploying the trailing axles 30A and 30B, the carriage 40 and auxiliary chassis 38 are raised with the actuators 44 by the hydraulic circuit 152 by (A) opening stowing valve (SV) 164 and closing exhaust (EV) valve 166, (B) closing deploying valve (DV) 168 and opening exhaust valve (EV) 170, and (C) setting the actuator operating pressure to a prescribed pressure with the regulator valve (RV) 160 that results in the actuators 44 then retracting but only to the extent shown in FIG. 1 for the purpose of stowing the trailing axles. And wherein the carriage 40 and auxiliary chassis 38 during the raising thereof effected by the actuators 44 as the latter retract to the prescribed limited extent are maintained in a substantially upright condition by the force of gravity acting thereon and their pivotal support by the suspension arms 42 that is provided by the auxiliary chassis supporting shaft 130. Whereby the actuators 44 on such limited hydraulic actuator retraction locate the carriage 40 and trailing axle chassis 38 above the dump body 14 and thus the truck chassis 18 and in a substantially upright condition with the rear end of the trailing axle chassis closely adjacent the upper end of the tail gate 16 and the trailing axle wheels 32A and 32B above the top edge 172 of the longitudinally extending sides of the dump body.

With the above established location of the trailing axle wheels 32A and 32B, the auxiliary chassis 38 is then extended by the pneumatically-operated actuator 50 with the pneumatic circuit 60 by (A) closing the chassis-retracting valve (CRV) 64 and exhaust valve (EV) 70 and (B) opening the chassis-extending valve (CEV) 68 and exhaust valve (EV) 66. Thereby positioning the auxiliary chassis 38 so that the rear trailing axle wheels 32B do not interfere with the pivotal movement of the tail gate 16 during subsequent opening and closing. Where after both of the trailing axles 30A and 30B are lowered forcing the trailing axle wheels 32A and 32B downward against the top edge 172 of the dump body sides to thereby firmly hold the carriage 40 and auxiliary chassis 38 and thus the trailing axles in a stowed condition that stabilizes this entire assembly from movement on the truck when the truck is moving and also when dumping a load. With this holding action accomplished with the pneumatic circuit 96 by (A) closing the axle-stowing valves (SV) 100 and (SV) 104 and opening the exhaust valves (EV) 102 and (EV) 106 serving the respective pneumatically-operated actuators 92A and 92B, (B) opening the axle-deploying valves (DV) 112 and (DV) 120 and closing the exhaust valves (EV) 114 and (EV) 122 serving the respective air springs 94A and 94B, and (C) establishing with the regulator valves (RV) 108 and (RV) 116) the air pressure then supplied to the respective air springs 94A and 94B at a relatively low pressure compared to that provided for forced trailing axle support of the truck chassis 18. And with this holding action accomplished with the assistance of the cross-member 128 by being strategically positioned to engage the top 56 of the carriage 40 to prevent the carriage and thereby the auxiliary chassis 38 from pivoting about the auxiliary chassis supporting shaft 130 in the clockwise direction as viewed in FIG. 1 in reaction to the downward force then being applied on the trailing axles 30A and 30B by the air springs 94A and 94B at the low air pressure. And alternatively, the holding of the carriage 40 and auxiliary chassis 38 firmly in place in their stowed condition is also accomplished with the assistance of the cross-member 128 using only the forwardly-located air springs 94A wherein these air springs are supplied with a suitable air pressure while exhausting the rearwardly-located air springs 94B.

Then when a load is added to the dump truck 10 and there is recognized that certain trailing axle use is warranted such as that recommended by the axle load monitoring system disclosed in U.S. patent application Ser. No. 14/803,048 entitled "AXLE LOAD MONITORING SYSTEM", the vehicle operator can deploy the trailing axles 30A and 30B via the CCM 74 and MCVC 72 by releasing the holding of the carriage 40 and auxiliary chassis 38 with the pneumatic circuit 96. And then retracting the auxiliary chassis 38 with respect to the carriage 40 with the pneumatic circuit 60 by (A) opening the chassis-retracting valve (CRV) 64 and exhaust valve (EV) 70, and (B) closing the chassis-extending valve (CEV) 68 and exhaust valve (EV) 66. Whereby the auxiliary chassis 38 is positioned as shown in FIG. 2 with the trailing axles 30A and 30B and their wheels 32A and 32B located in their stowed condition on the auxiliary chassis to pass without interference over the upper rear end of the dump body 14 and the top of the tail gate 16 and with the trailing axles then positioned with respect to the carriage 40 to help support the truck chassis 18 with eventual operation of the air springs 94A and 94B.

Continuing on with the deployment of the trailing axles 30A and 30B, the vehicle operator acting through the CCM 74 and MCVC 72 then effects full extension of the actuators 44 from their condition shown in FIG. 2 and thereby lowering of the carriage 40 and auxiliary chassis 38 and thus the trailing axles. Wherein during such lowering/deploying, the carriage 40 and auxiliary chassis 38 pass through the position shown in phantom lines in FIG. 3 and eventually locate in their fully deployed condition shown in solid lines in FIG. 3. And wherein the carriage 40 and auxiliary chassis 38 have maintained an upright position throughout their lowering by virtue of gravity and their pivotal support by the suspension arms 42 provided by the auxiliary chassis supporting shaft 130 and with the suspensions arms 42 on the full extension of the actuators 44 then positioned substantially parallel to the road surface 20 and held there by the actuators 44.

Continuing on with the deployment of the trailing axles 30A and 30B, the vehicle operator acting through the CCM 74 and MCVC 72 then closes the axle-stowing valves (SV) 100 and (SV) 104 and opens the exhaust valves (EV) 102 and (EV) 106 serving the respective pneumatically-operated actuators 92A and 92B, and (B) opens the axle-deploying valves (DV) 112 and (DV) 120 and closes the exhaust valves (EV) 114 and (EV) 122 serving the respective air springs 94A and 94B thereby deploying the trailing axles for their supporting role in helping to support the truck chassis 18 with the auxiliary chassis 38. Wherein with the trailing axles 30A and 30B thus deployed for action, the hydraulically-operated actuators 44 then provide a resisting force with the controllable hydraulic pressure that acts on the auxiliary chassis 38 at a location substantially midway between the trailing axles 30A and 30B preventing upward auxiliary chassis movement enabling the air springs 94A and 94B and thereby the auxiliary chassis 38 to help support the truck chassis 18 to a variable degree determined by the air pressure being supplied. And wherein the resisting force acting on the auxiliary chassis 38 provided by the hydraulically-operated actuators 44 as noted previously is applied at its pivotal support on the suspension arms 42 provided by the auxiliary chassis supporting shaft 130 and thereby at a location on the auxiliary chassis 38 between the trailing axles 30A and 30B throughout their operating range of movement relative to the auxiliary chassis in helping to support the truck chassis 18 with the auxiliary chassis 38 and to the degree/extent determined by the air pressure supplied to the trailing axle air springs 94A and 94B by their separate control circuits that provide flexibility in addressing the various circumstances that can exist.

For example, when the trailing axles 30A and 30B are not bearing equal weight as the result of the external load on the auxiliary axles including their weight, the weight distribution of the auxiliary chassis and the remainder of the dual trailing axle assembly or any additional load placed on the auxiliary chassis that is not equally distributed to the two axles, the trailing axle bearing more weight will then require more lift force. And if the trailing axle air springs 94A and 94B are functionally equivalent and the same air pressure is applied to both, the result will be the axle with greater weight will have its air springs more compressed than the other axle since the air springs increase lift force as they are compressed and decrease lift force as they are extended. And this would undesirably result in the auxiliary chassis 38 being angled relative to the road (not level) and with the degree of the angle being proportional to the difference in weight acting on the trailing axles. But with the control circuits for the air spring 94A and 94B being separate, higher air pressure can be applied to the air springs at the trailing axle bearing more weight so that the air springs at both of the trailing axles are at the same ride height but provide different lift force. Furthermore, when equal lift force is desired by the trailing axles and their air springs are not the same, they may not be equal in reacting to the air spring force being applied whereby equal air pressure does not equate to equal down force and as a result, one trailing axle may require higher air spring pressure than the other to achieve the same lift force. Moreover, by providing independent control circuits for the air springs 94A and 94B, the dual trailing axle system according to the present invention lends itself to controlling the lift force on the two trailing axles in a manner that provides improved vehicle handling as well as controlling the operation of the trailing axles 30A and 30B automatically with a control system like that in U.S. patent application Ser. No. 14/803,045 entitled "AUTOMATIC AUXILIARY AXLE CONTROL SYSTEM".

Continuing on with the operation of the dual trailing axle suspension system 36 with the auxiliary chassis 38 continuing to help support the truck chassis 18, the trailing axle wheels 32A and 32B at one side or both sides of the auxiliary chassis 38 while traveling over a bump in the road surface are allowed to travel up and down reaction in reaction thereto until the trailing axle air springs 94A and 94B are fully compressed and then allowed to continue to travel upward if necessary because of the height of the bump and to the extent allowed of the carriage 40 and auxiliary chassis 38 provided by the actuator gas springs 142 in allowing road-induced retraction of the actuators 44 to accommodate such extended upward travel of the trailing axles. On the other hand, the trailing axles 30A and 30B continue to help support the truck chassis 18 while the trailing axle wheels 32A and 32B at one side or both sides of the auxiliary chassis 38 sequentially travel over a depression such as a pothole in the road surface. And in that case the trailing axles 30A and 30B maintain their support of the truck chassis 18 until the trailing axle air springs 94A and 94B are fully extended and thereby limit further downward trailing axle movement.

Apart from bumps and depressions in the road surface, there can occur significant differences in elevation between the road surface supporting the primary axles 24, 26A and 26B and that supporting the trailing axles 30A and 30B wherein the trailing axles will continue to help in supporting the truck chassis 18. For example, in the road situation shown in FIG. 14 with the actuators 44 remaining extended in holding the position of the suspension arms 42 relative to the truck chassis 18, the trailing axles 30A and 30B are shown traveling on an upwardly inclined section 20A in the road surface 20 behind the primary axles 22, 26A and 26B. Resulting in the trailing axles 30A and 30B then being at significantly different elevations below that of the primary axles and forcing the auxiliary chassis 38 to pivot on the suspension arms 42 in the clockwise direction enabled by the shaft 130 and assume the same angle as the road section 20A and thereby adjust thereto. Whereby the trailing axle wheels 32A and 32B with the action of the air springs 94A and 94B have remained in forced contact with the road section 20A and the trailing axles 30A and 30B continue to help in supporting the truck chassis 18 and with the ability of the dual trailing axle suspension system 36 to accommodate steeper inclines behind the primary axles until the air springs 94A and 94B when fully extended loose road contact.

And by further example in the road situation shown in FIG. 15 with the actuators 44 remaining extended in holding the position of the suspension arms 42 relative to the truck chassis 18, the trailing axles 30A and 30B are shown traveling on a level section 20B in the road surface 20 that is behind and below that at the primary axles 22, 26A and 26B. And the air springs 94A and 94B have forced the trailing axles 30A and 30B downward without accompanying pivotal movement of the auxiliary chassis 38 relative to the suspension arms 42. Whereby the trailing axle wheels 32A and 32B have remained in forced contact with the road surface with the down force applied by the air springs 94A and 94B and continue in helping to support the truck chassis 18 and with the ability of the dual trailing axles suspension system 36 to accommodate larger elevation differences of this kind to the extent enabled by the air springs 94A and 94B.

Referring now to the road situation shown in FIG. 16, the trailing axles 30A and 30B are shown traveling on a downwardly inclined section 20C in the road surface 20 that is behind the primary axles 22, 26A and 26B and thereby requires location of the trailing axles at different elevations on the road section 20C that are above the road elevation at the primary axles 22, 26A and 26B and to an extent that is greater than that allowed by full compression of the trailing axle air springs 94A and 94B and accompanying forced pivoting of the auxiliary chassis 38 about the shaft 130 with respect to the suspension arms 42 in assuming the angle of this road section Which thus limits the ability of the trailing axles to continue to help support the truck chassis in this situation beyond that enabled by the air springs alone. And in accommodating this road situation, the trailing axle wheels 32A and 32B with their forced contact with the road section 20C by the air springs 94A and 94B have effected forced retraction of the hydraulically-operated actuators 44 from their extended condition by the hydraulic fluid displacement enabled by the action of the actuator gas springs 142 thereby allowing the auxiliary chassis 38 to have raised with respect to the truck chassis 18 while the actuators 44 continue to provide resisting force on the auxiliary chassis enabling the forced loading of the trailing axles and the trailing axle wheels 32A and 32B having forced the auxiliary chassis to pivot in the counter-clockwise direction in assuming the same angle as the downwardly inclined road section 20C and thereby adjust thereto. Whereby the trailing axle wheels 32A and 32B have remained in forced contact with the road section 20C and the trailing axles 30A and 30B continue to help in supporting the truck chassis 18 under the action of the air springs 94A and 94B and with the ability of the dual trailing axle suspension system 36 to accommodate steeper downwardly inclined road sections behind the primary axles to the extent enabled by the actuator gas springs 142.

Referring now to the road situation shown in FIG. 17, the trailing axles 30A and 30B are shown traveling on a level section 20D in the road surface 20 that is behind and above the elevation of the road surface at the primary axles 22, 26A and 26B. And like in the FIG. 14 road situation in accommodating this road situation, the hydraulically-operated actuators 44 have partially retracted from their extended condition allowed by the forced hydraulic displacement action enabled by the gas springs 142 while continuing to provide a resisting force enabling the loading of the trailing axles 32A and 32B with the air springs 94A and 94B with accompanying pivotal movement of the auxiliary chassis 38 relative to the suspension arms 42 in the clockwise direction while remaining upright. Whereby the trailing axles 30A and 30B are forced to continue in helping to support the truck chassis 18 on the level section 20D and with the ability of the dual axles suspension system 36 to accommodate larger elevation differences of this kind to the extent enabled by the gas springs 142.

In considering the different road situations that can be encountered including those that have been shown and described, the air springs 94A and 94B are like those generally used to provide lift force with both pusher axles and tag axles. And as these air springs compress, their diameter increases. As a result, when a constant air pressure is supplied to the air springs, the lift force produced by the air springs is least when they are fully extended and their diameters are minimized, and is greatest when they are fully compressed and their diameters are maximized. And for example and with reference to the different road situations shown in FIGS. 1 and 14-17, if 40 psi air pressure is maintained in the air springs, then the maximum force with the these air springs fully compressed is capable of producing a total lift force of 22,000 pounds. And the hydraulic pressure forcing the extension of the actuators is determined so that the resisting force of the actuators is 22,000 pounds and thus the actuators will retract only when this force is exceeded and only when the air springs are fully compressed. With the result that lower elevations of the road surface at the trailing axle wheels 32A and 32B are accommodated by the full extension of the air springs 94A and 94B with the hydraulically-operated actuators remaining hydraulically rigid as shown in FIGS. 14 and 15 while higher elevations of the road surface at the trailing axle wheels are accommodated by compression of the air springs and subsequent retracting of the hydraulically-operated actuators provided by the action of the actuator gas springs 142 as shown in FIGS. 16 and 17. And thus the lift force provided by the trailing axles 30A and 30B when the air springs 94A and 94B are maintained with constant pressure will vary as the truck travels over elevation changes in the road surface with the trailing axles providing less lift force when they are at lower elevations than the truck's primary axle wheels and greater lift force when the trailing axle wheels are at higher elevations than the truck's primary axle wheels. And if constant lift force by the trailing axles is desired throughout elevation changes, this can be provided in controlling the air pressure supplied in an appropriate manner during these transitional conditions.

Considering now an example of the dual trailing axle suspension system 36 utilizing commercially available trailing axles and air springs, the spacing provided between the trailing axles 30A and 30B is set at 40 inches and the distance provided from the rearmost primary axle 26B to the midpoint between the trailing axles 30A and 30B when deployed is set at 12 feet. With this resulting in the distance from the rearmost primary axle 26B to the forward most trailing axle 30A being 10 feet-4 inches and to the rearmost trailing axle 30B being 13 feet-8 inches. And using commercially available trailing axles 30A and 30B and air springs 94A and 94B with this dimensional arrangement, the dual trailing axle suspension system 36 is capable of allowing elevation changes of the trailing axles 30A and 30B of 16 inches below the truck's primary axles 22, 26A and 26B and 20 inches above the primary axles. Resulting in the downward trailing axle travel limitation of 16 inches being more than sufficient for public roadways as such downward travel at 12 feet behind the truck is capable of handling road grade changes over 10 percent. And if more downward travel of the trailing axles 30A and 30B is desired, this can be provided in the selection of air springs suited to the desired tasks. On the other hand, the relative upward travel limitation of 20 inches allowed of the trailing axles 30A and 30B in this exemplary is dependent on the total volume of the gas accumulator portion of the gas springs 142 associated with the hydraulically-operated actuators 44, the total volume of the hydraulic fluid within the actuators 44, the volume of hydraulic fluid displaced when the actuators retract to allow such upward travel, and the maximum increase in the hydraulic pressure desired. And if more relative upward travel of the trailing axles 30A and 30B is desired, this can be obtained without increasing the hydraulic pressure by simply increasing the gas accumulator volume associated with the gas springs 142.

Figure 18:
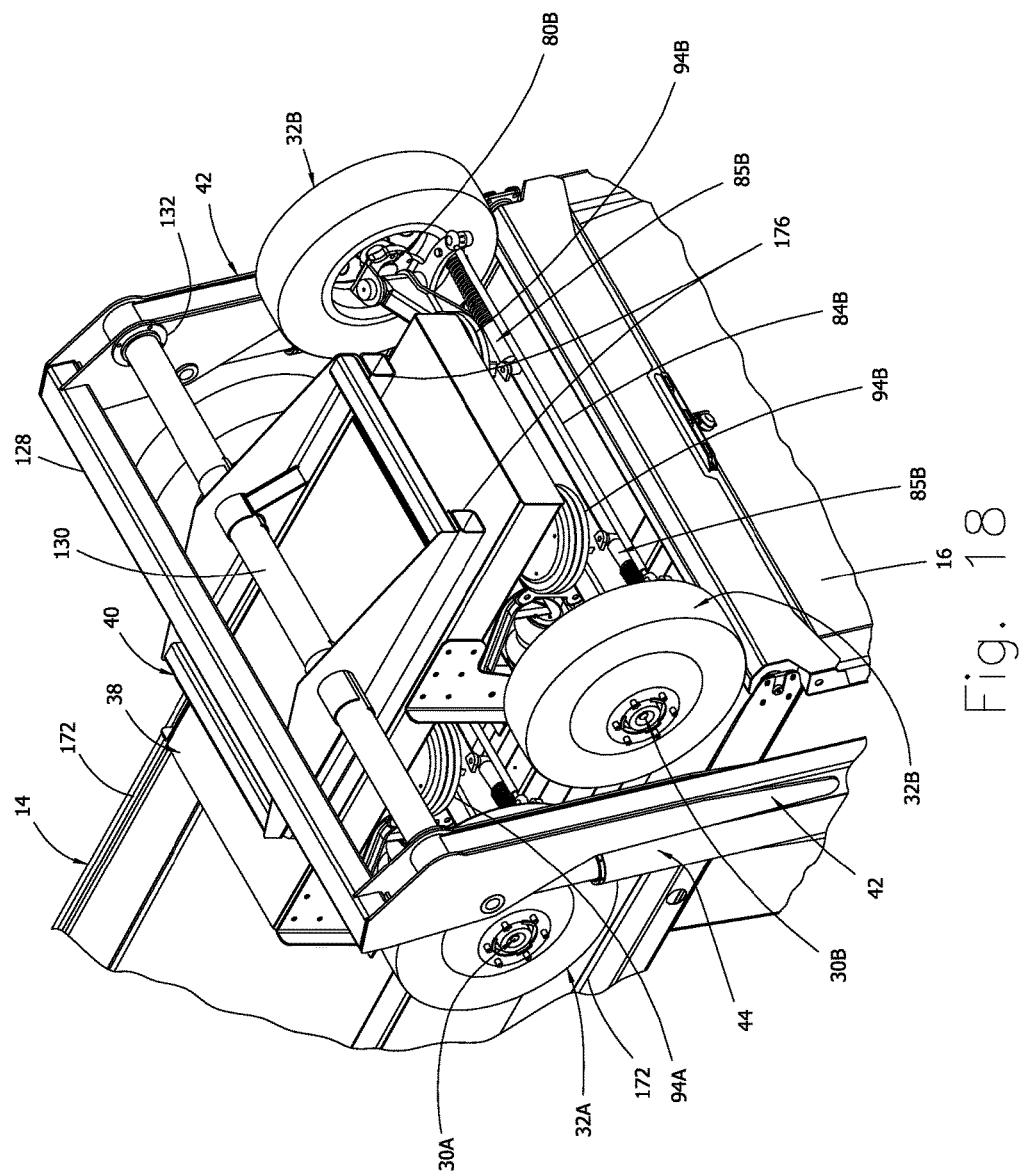
FIG. 18 is a view like FIG. 6 wherein the auxiliary chassis is fixed to the carriage.

Describing now the stowing of the trailing axles 30A and 30B following their use and with reference to FIG. 4, the vehicle operator via the CCM 74 and MCVC 72 stows the trailing axles by reversing the sequential deploying operations previously described. And in their stowed condition with the auxiliary chassis 38 and carriage 40 firmly held in place by the air springs 94A and 94B pressing the trailing axle wheels 32A and 32B against the top edges 170 of the dump body 14 with the cooperation of the cross-member 128 that joins the suspension arms 42, the dump body as shown in FIG. 18 is raised at its forward end from the truck chassis 18 by a pneumatically-operated lifting mechanism 171 to tilt the dump body and thereby provide for dumping a load with the opening of the tail gate 16.

And having described the operation of the dual trailing axle suspension system 36 covering various road conditions that can be encountered, it will be appreciated that the resisting force acting on the auxiliary chassis 38 provided by the hydraulically-operated actuators 44 in enabling the air springs 94A and 94B to force the auxiliary chassis 38 to help support the truck chassis 18 is established and maintained at a location between the trailing axles 30A and 30B throughout their range of movement relative to the auxiliary chassis with such varying road conditions. Thereby providing for the net lifting force of the two trailing axles (the lifting force minus any external load including the axle's weight) to directly oppose the resisting force of the hydraulically-operated actuators and thereby be transferred to provide the intended auxiliary support. And if the location of the resisting force on the auxiliary chassis was not provided and maintained between the trailing axles throughout their range of movement relative to the auxiliary chassis, the trailing axles could not lift against the resistance of the hydraulically-operated actuators. And instead, the air springs acting on the trailing axles would extend to their maximum extent allowing the auxiliary chassis to pivot with the result that no lifting force would be applied to help support the motor vehicle chassis. And wherein the forces and torques would balance only by the air springs becoming fully extended and the auxiliary chassis would then be pivoted to such a degree that only the wheels of one of the trailing axles would maintain contact with the road surface while the wheels of the other trailing axle would lose contact with the road surface.

Furthermore, by the dual trailing axle suspension system according to the present invention providing for substantially equal loading of the two trailing axles when the external loading of these two axles is substantially equal, if one of the trailing axles is closer to the pivot axis of the auxiliary chassis than the companion trailing axle, its moment arm is shorter and therefore it applies less torque about the axis than the companion trailing axle at any given force. And therefore, the trailing axle closer to the auxiliary chassis pivot axis must apply a greater lifting force than the companion trailing axle to balance the torques. And the amount of additional force required by the trailing axle that is closer to the auxiliary chassis pivot axis is directly proportional to how much closer it is to the axis thereby making it possible to readily determine how to proportion the loading of the trailing axles with their air springs in providing the desired vehicle support in a particularly advantageous manner. For example, if one of the auxiliary axles is 25 percent closer to the pivot axis of the auxiliary chassis, it will require 25 percent more net lifting force/air pressure than the companion trailing axle. And if the external loading of the two trailing axles (the weight that each bear apart from the air spring loading) is substantially equal, then the required lifting force of the two trailing axles and their air spring pressure will be substantially equal in providing the desired motor vehicle chassis support. Furthermore, if the two trailing axles are substantially identical in all respects, the air pressure applied to each axle's air springs will be substantially equal in obtaining the desired vehicle support.

Furthermore, the dual trailing axle suspension system according to the present invention provides for accommodating the widest possible range of external loading imbalance between the two trailing axles if an external load is placed on the auxiliary chassis, or the weight of the auxiliary chassis and trailing axles is not distributed equally to the two axles, and this results in one trailing axle bearing a weight that is significantly more than the other trailing axle. As the system can accommodate this to the maximum degree with either trailing axle bearing the greater load by virtue of the pivot axis of the auxiliary chassis always being located between the two trailing axles throughout their range of movement relative to the auxiliary chassis. And wherein the trailing axle bearing more weight will then need to apply a greater lifting force than the companion trailing axle that can be accomplished with the air pressure provided by its separate pneumatic circuit.

Furthermore, the dual trailing axle suspension system according to the present invention provides for maximizing the pivotal balancing capabilities of the trailing axle wheels when encountering elevation changes such as shown in FIGS. 14-17 and described above and the frictional forces from acceleration and braking. For example, when a bump, pothole, or other elevation change is encountered, the trailing axle wheels encountering the elevation change will experience a resultant force that is directed at forward or rearward angles relative to the normal force that is perpendicular the road surface. And when accelerating and braking, the friction induced force will be directed forward or rearward at the point where the trailing axle wheels contact the road surface. And in these instances, the air springs loading one of the trailing axles will compress thereby increasing its force while the air springs loading the companion trailing axle will extend thereby decreasing its force as necessary to balance the torques from these new and briefly encountered forces.

It will also be appreciated that other embodiments of the invention can take various forms and whether it is applied to a motor vehicle having powered tandem axles or only one powered axle. Or there may be no load container and depending on the accommodating space on a particular vehicle for stowing the dual trailing axles, there may be no need to provide for relative movement between the auxiliary chassis and carriage for clearance purposes during stowing and deploying of the trailing axles. In that case as shown in FIG. 18, the auxiliary chassis 38 is for example rigidly fixed to the carriage 40 by a pair of spacer members 176 of square tubular shape that replace the guide rails 46, guide members 48 and rectangular box 49 and permanently fix the auxiliary chassis to the carriage with their pivotal support on the suspension arms 42 positioned above and between the trailing axles 30A and 30B in the designated location for dual trailing axle operation described previously and with the pneumatically-operated actuator 50 eliminated absent the need for such.

In addition to the above manner of operation of the dual trailing axle suspension system 36, it will also be appreciated that the air springs 94A and 94B can be maintained at a constant pressure thus providing the axle suspensions 78A and 78B with a set spring action instead of the variable spring action provided by varying the pressure in the air springs in determining the degree of help provided by the auxiliary chassis in supporting a motor vehicle chassis. And in that case the hydraulically-operated actuators 108 are operated to apply a force on the auxiliary chassis 38 forcing its downward movement against the air springs 94A and 94B in causing the auxiliary chassis to help support the truck chassis 18 to a variable degree. Instead of the actuators 108 providing a resisting force on the auxiliary chassis 38 and the pressure in the trailing axle air springs 94A and 94B being controlled to vary the support of the truck chassis provided by the auxiliary chassis as previously described.

Furthermore, the dual trailing axle suspension system according to the present invention can have the two axles suspended from the auxiliary chassis 38 with a wide range of axle suspensions having a set spring action in causing the auxiliary chassis 38 to help support the motor vehicle chassis 18 to a variable degree in essentially the same manner as the axle suspensions 78A and 78B when their air springs are provided with a set pressure as described above. For example, there is shown in FIGS. 19 and 20 another embodiment of the dual trailing axle suspension system according to the present invention that accomplishes the desired results with a set spring action provided by springs of the elastic type.

Wherein the auxiliary chassis 38 is now supported by trailing axles 178A and 178 B with self-steering wheels 180A and 180B that are linked by tie rods 182A and 182B, stabilized with coil spring/shock absorber assemblies 184A and 184B and suspended from the auxiliary chassis 38 with elastic spring action by semi-elliptic leaf spring suspension systems 186A and 186B. With the suspension systems 186A and 186B comprising a pair of semi-elliptical leaf spring arrangements 188A and 188B extending longitudinally of the auxiliary chassis 38 between the respective trailing axles 178A and 178B and side members 76A of the frame 76 that are braced along their length by transverse cross-members 76B.

And in suspending the trailing axles 178A and 178B, the forward end of the longest and uppermost leaf spring in the leaf spring arrangements 188A are pivotally mounted on the lower side of the opposing frame side member 76A with pin and hanger assemblies 190A, the rearward end of the longest and uppermost leaf spring in the leaf spring arrangements 188B are pivotally mounted on the lower side of the opposing frame side member 76A with pin and hanger assemblies 190B, and a mid-portion of the leaf spring arrangements 188A and 188B is rigidly mounted on the upper side of the trailing axles 178A and 178B with bracket assemblies 192A and 192B respectively. And with the opposing ends of the longest and uppermost leaf spring in the leaf spring arrangements 188A and 188B mounted on the lower side of the opposing frame side member 76A with shackles 194A and 194B respectively that are pivotally connected at their lower end to the ends of a rocking link 196 that is pivotally supported with a pivot pin 198 by a bracket 200 fixed to the lower side of the opposing frame side member 76A.

Figure 19:
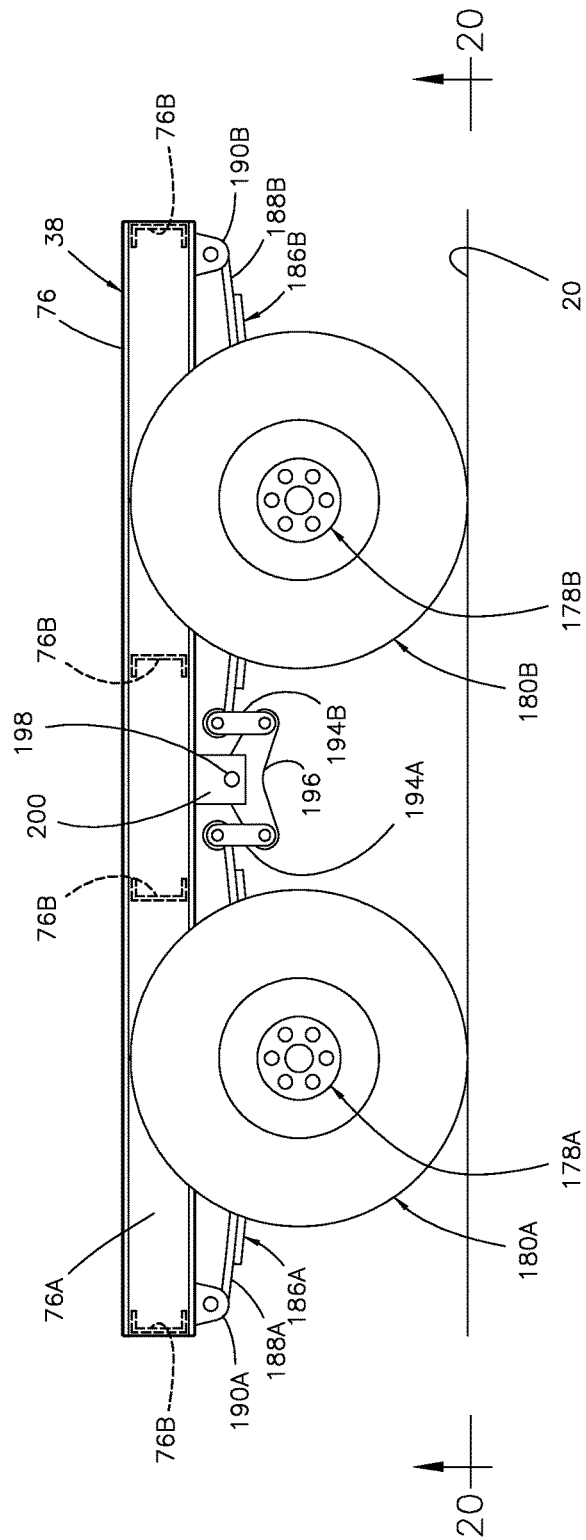
FIG. 19 is a side view of the auxiliary chassis wherein the two trailing axles are suspended from the chassis with leaf spring suspension systems.
Figure 20:
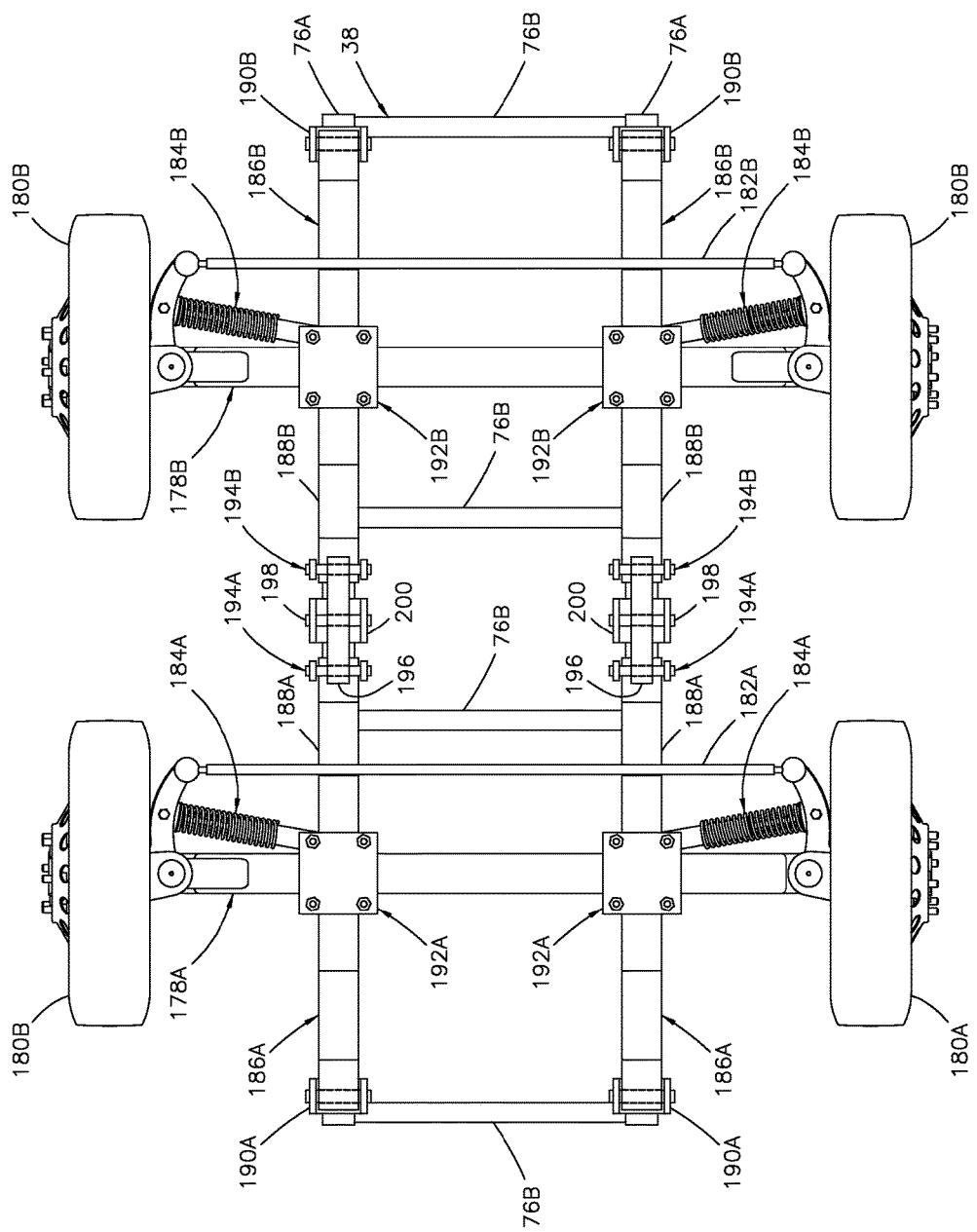
FIG. 20 is a view taken along the lines 20-20 in FIG. 19 when looking in the direction of the arrows.

And wherein the rocking link pivot pins 198 are located above and equidistant from the pivotal connections of the shackles 194A and 194B with the rocking link 196 and the shackles are oriented in a substantially vertical position as shown in FIG. 19 when the leaf spring arrangements 188A and 188B are compressed to substantially half of the extent allowed in establishing the mean ride height of the auxiliary chassis 38 when helping to support the truck chassis 18. And the trailing axles 178A and 178B are located by the semi-elliptic leaf spring suspension systems 186A and 186B so that the hydraulically-operated actuators 44 act on the carriage 40 and thereby the auxiliary chassis 38 at a location substantially midway between the trailing axles 178A and 178B throughout their range of movement relative to the auxiliary chassis in causing the auxiliary chassis to help support the truck to a variable degree by the hydraulically-operated actuators 44 forcing the auxiliary chassis 38 downward against the leaf spring suspension systems 186A and 186B. And wherein it will be understood that other suitable leaf spring suspensions could be arranged transversely of the auxiliary chassis or another form of elliptic-leaf springs employed or that other structural forms of springs such as coil springs and torsion bars could be employed. And with the objective of minimizing the extent of the control system for operating the dual trailing axle suspension system according to the present invention as implemented with various axle suspension systems.

It will also be appreciated that in the case of the two trailing axles 30A and 30B being suspended from the auxiliary chassis 38 with the air spring axle suspensions 78A and 78B, the air springs 94A and 94B without air pressure can be fully compressed with the pneumatically-operated actuators 92A and 92B to thereby minimize the overall height of the auxiliary chassis and trailing axles 30A and 30B in order to clear the tailgate 16 and dump body 14 as the suspension arms 42 are raised and lowered by the hydraulically-operated actuators 44 for stowage and deployment of the auxiliary chassis and thereby the trailing axles 30A and 30B. And in respect to stowage and once the suspension arms 42 are raised to the extent possible on full retraction of the actuators 44 and the auxiliary chassis 38 positioned above the dump body 14, the air springs 94A and 94B or only the air springs 94A can be pressurized forcing the trailing axle wheels 32A and 32B against the top edges 172 of the dump body 14 to thereby firmly hold the auxiliary chassis on the load container when the truck is in motion and when the load container is tilted to dump a load. And wherein the cross-member 128 extending between the suspension arms 42 prevents the carriage 40 and thereby the auxiliary chassis 38 from pivoting in reaction to the pressuring of the air springs.

And with regard to stowage and deployment of the trailing axles 178A and 178B wherein they are suspended from the auxiliary chassis 38 with the leaf spring suspension systems 186A and 186B, the trailing axles will be extended from the auxiliary chassis by the springs in these suspension systems to the maximum extent as the trailing axle wheels 180A and 180B are lifted from a road surface when the hydraulically-operated actuators 44 are retracted. And to compensate for this, the suspension arms 42 and hydraulically-operated actuators 44 are lengthened compared to that utilized with the pneumatically-operated actuators 92A and 92B and air springs 94A and 94 B such that the auxiliary chassis supporting shaft 130 is further distanced from the suspension arm pivot pins 126 to the extent necessary for the trailing axle wheels 180A and 180B to clear the top of the dump body 14 and tail gate 16 as the trailing axles pass over for stowage or deployment. And with the suspension arms 42 angled forward of vertical when the hydraulically-operated actuators 44 are fully retracted and the auxiliary chassis 38 is in the fully stowed position, the auxiliary chassis 38 moves downward toward the dump body after the suspension arms pass vertical in the stowage direction following further retraction of the hydraulically-operated actuators 44. With the trailing axle wheels 180A and 180B then making contact with the top edges 172 of the dump body 14 before the hydraulically-operated actuators 44 are fully retracted whereby the trailing axle suspension springs are compressed to firmly hold the trailing axle wheels against the top edges of the dump body and thereby hold the auxiliary chassis 38 in place on the dump body when the actuators are eventually fully retracted. And wherein the cross-member 128 extending between the suspension arms 42 prevents the carriage 40 and thereby the auxiliary chassis 38 from pivoting in reaction to the force being applied to compress these trailing axle springs in providing the holding action. And wherein the above sequence of events is reversed to deploy the trailing axles 178A and 178B with extension of the hydraulically-operated actuators 44.

It will also be appreciated that in addition to the above exemplary embodiments, the dual trailing axle suspension system according to the present invention is readily adaptable to a wide range of motor vehicles. For example, the motor vehicle can take various other forms such as refuse trucks, transit concrete mixing trucks, open-bed trucks, utility trucks, and military trucks. Wherein the motor vehicle may have only two primary axles with one of them powered and also one or more pusher axles and/or tag axles for auxiliary use. Or the motor vehicle may have three primary axles with two of them powered as well as one or more pusher axles and/or tag axles for auxiliary use. And the dual trailing axle suspension system is readily adaptable to accommodate such in the manner of operation described above with respect to stowing the auxiliary chassis and thereby the two trailing axles with respect to the particular motor vehicle.

In addition, it will be appreciated that actuators providing the intended operation of helping to support the motor vehicle chassis can be utilized that are not of the hydraulically-operated type shown and take other forms. Such as pneumatically-operated actuators and ball nut and screw actuators that are operated in a manner suited to the objectives of the present invention. And it will also be appreciated that the trailer hitch latching mechanism can be released with a powered actuator rather than manually.

Furthermore, the gas springs that provide for extended upward travel of the trailing axles can have their piston arranged separate from the hydraulically-operated piston to operate in a likewise hydraulic and gas pressured manner and separately provided with a gas accumulator of adequate volume with the prescribed gas pressure charge instead of with a common gas accumulator that serves both of the actuator gas springs. Or the actuator gas springs can be dispensed with if the added trailing axle movement they provide is not called for. And instead of there being only dual trailing axles serving as the auxiliary axles, the motor vehicle may have one or more pusher axles and/or one or more tag axles for added vehicle support. And instead of a tiltable dump body serving as a load container, the load container could be fixed to the motor vehicle chassis and have a roof or a stowing platform for the dual trailing axles that is provided or the motor vehicle may have an open bed with no load container and the carriage and auxiliary chassis with the trailing axles would then be firmly held in the stowed condition on what is available or added. In addition, it will also be recognized that the force acting on the auxiliary chassis could also be located below as well above the trailing axles taking into account in the latter case the provision of adequate ground clearance.

And thus the scope of the invention is intended to be limited only by the accompanying claims.

The invention claimed is:
1. A dual trailing axle suspension system comprising
an auxiliary chassis,
two axles directly suspended from the auxiliary chassis with axle suspensions that provide spring action for isolating road-induced axle movement from the auxiliary chassis, and
an auxiliary chassis suspension adapted to suspend the auxiliary chassis from a chassis of a motor vehicle and deploy the auxiliary chassis from a stowed location on the motor vehicle to a deployed location located at a substantial distance behind the motor vehicle chassis and then cause the auxiliary chassis to help support the motor vehicle chassis to a variable degree by acting on the auxiliary chassis at a location substantially midway between the two axles in a manner determined by whether the spring action provided by the axle suspensions is set or variable.

2. A dual trailing axle suspension system as set forth in claim 1 wherein
the axle suspensions have air springs supplied with a controllable air pressure providing the spring action, and
the auxiliary chassis suspension is adapted to prevent upward auxiliary chassis movement by the air springs in causing the auxiliary chassis to help support the motor vehicle chassis.

3. A dual trailing axle suspension system as set forth in claim 1 wherein
the axle suspensions have air springs with a set air pressure providing the spring action, and
the auxiliary chassis suspension is adapted to force downward auxiliary chassis movement against the action of the air springs in causing the auxiliary chassis to help support the motor vehicle chassis.

4. A dual trailing axle suspension system as set forth in claim 1 wherein
the axle suspensions have elastic springs providing a set spring action, and
the auxiliary chassis suspension is adapted to force downward auxiliary chassis movement against the action of the springs in causing the auxiliary chassis to help support the motor vehicle chassis.

5. A dual trailing axle suspension system as set forth in claim 1 wherein
the auxiliary chassis suspension comprises a pair of actuators adapted to act on the auxiliary chassis in causing the auxiliary chassis to help support the motor vehicle chassis.

6. A dual trailing axle suspension system as set forth in claim 1 wherein
the auxiliary chassis suspension comprises a pair of hydraulically-operated actuators adapted to act on the auxiliary chassis in causing the auxiliary chassis to help support the motor vehicle chassis.

7. A dual trailing axle suspension system as set forth in claim 1 wherein
the auxiliary chassis suspension comprises a pair of suspension arms and a pair of actuators adapted to cooperatively suspend the auxiliary chassis from the motor vehicle chassis, and
the actuators are adapted to act on the auxiliary chassis in causing the auxiliary chassis to help support the motor vehicle chassis.

8. A dual trailing axle suspension system as set forth in claim 1 wherein
the auxiliary chassis suspension comprises a pair of suspension arms and a pair of hydraulically-operated actuators adapted to cooperatively suspend the auxiliary chassis from the motor vehicle chassis, and
the actuators are adapted to act on the auxiliary chassis in causing the auxiliary chassis to help support the motor vehicle chassis.

9. A dual trailing axle suspension system as set forth in claim 1 wherein
the auxiliary chassis suspension comprises a pair of suspension arms and a pair of actuators adapted to cooperatively suspend the auxiliary chassis from the motor vehicle chassis,
the auxiliary chassis is supported by the suspension arms for pivotal movement that places the auxiliary chassis in an upright condition when helping to support the motor vehicle chassis, and
the actuators are adapted to act on the auxiliary chassis while in the upright condition in causing the auxiliary chassis to help support the motor vehicle chassis.

10. A dual trailing axle suspension system as set forth in claim 1 wherein
the auxiliary chassis suspension comprises a pair of suspension arms and a pair of hydraulically-operated actuators adapted to cooperatively suspend the auxiliary chassis from the motor vehicle chassis,
the auxiliary chassis is supported by the suspension arms in a fixed position that places the auxiliary chassis in an upright condition when helping to support the motor vehicle chassis, and
the actuators are adapted to act on the auxiliary chassis while in the upright condition in causing the auxiliary chassis to help support the motor vehicle chassis.

11. A dual trailing axle suspension system as set forth in claim 1 wherein the auxiliary chassis suspension comprises a pair of suspension arms and a pair of actuators adapted to cooperatively suspend the auxiliary chassis from the motor vehicle chassis, the auxiliary chassis is supported by the suspension arms, and the actuators are adapted to act on the auxiliary chassis via the suspension arms in causing the auxiliary chassis to help support the motor vehicle chassis.

12. A dual trailing axle suspension system as set forth in claim 1 wherein the auxiliary chassis suspension comprises a pair of suspension arms and a pair of hydraulically-operated actuators adapted to cooperatively suspend the auxiliary chassis from the motor vehicle chassis, the auxiliary chassis is supported by the suspension arms, and the actuators are adapted to act on the auxiliary chassis via the suspension arms in causing the auxiliary chassis to help support the motor vehicle chassis.

13. A dual trailing axle suspension system as set forth in claim 1 wherein the auxiliary chassis suspension comprises a pair of hydraulically-operated actuators adapted to act on the auxiliary chassis in causing the auxiliary chassis to help support the motor vehicle chassis, and the auxiliary chassis suspension includes gas springs operatively associated with the actuators adapted to allow the actuators to accommodate limited upward movement of the auxiliary chassis beyond that allowed by the axle suspensions when the auxiliary chassis is traveling a road surface at an elevation higher than that of the motor vehicle chassis.

14. A dual trailing axle suspension system as set forth in claim 1 wherein the axle suspensions have air springs controlled by separate pneumatic control circuits, and the control circuits are adapted to supply air at a variable pressure and at a set pressure to the air springs.

15. A dual trailing axle suspension system as set forth in claim 1 wherein the axle suspensions have air springs controlled by separate pneumatic control circuits, the control circuits are adapted to supply air at a variable pressure and at a set pressure to the air springs, and the axle suspensions have pneumatically-operated actuators adapted to stow the associated trailing axle under the auxiliary chassis.

16. A dual trailing axle suspension system as set forth in claim 1 wherein the axle suspensions each comprise a pair of pneumatically-operated actuators and a pair of air springs, the actuators are adapted to establish the associated axle in a retracted location under the auxiliary chassis when supplied with air pressure and the air springs associated with the axle are exhausted of air pressure to thereby compact the axles with respect to the auxiliary chassis, and the air springs are adapted to extend the associated axle from the retracted location and provide the spring action associated therewith when the air springs are supplied with air pressure and the actuators associated with the axle are exhausted of air pressure.

17. A dual trailing axle suspension system as set forth in claim 1 wherein the auxiliary chassis suspension comprises a pair of suspension arms, a pair of hydraulically-operated actuators and a carriage, the suspension arms and actuators are adapted to cooperatively suspend the carriage from the motor vehicle chassis, the auxiliary chassis is carried from overhead by the carriage, the carriage is pivotally supported by the suspension arms and thereby pivotally supports the auxiliary chassis on the suspension arms, and the auxiliary chassis is fixed to the carriage at a location that positions the auxiliary chassis to be acted on at the designated location by the actuators via the carriage.

18. A dual trailing axle suspension system as set forth in claim 1 wherein the auxiliary chassis suspension comprises a pair of suspension arms, a pair of hydraulically-operated actuators, a carriage and a pneumatically-operated actuator, the carriage is supported by the suspension arms for pivotal movement, the suspension arms and hydraulically-operated actuators are adapted to cooperatively suspend the carriage from the motor vehicle chassis, the auxiliary chassis is adapted to be carried from overhead by the carriage and pivot therewith, and the pneumatically-operated actuator is adapted to position the auxiliary chassis at a location under the carriage so as to be acted on at the designated location by the hydraulically-operated actuators via the carriage.

19. A dual trailing axle suspension system as set forth in claim 1 wherein the auxiliary chassis suspension comprises a pair of suspension arms and a pair of hydraulically-operated actuators adapted to cooperatively suspend the auxiliary chassis from the motor vehicle chassis, and the auxiliary chassis is fixed to the suspension arms so that the auxiliary chassis assumes a substantially upright position when the auxiliary chassis is in the deployed location.

20. A dual trailing axle suspension system as set forth in claim 1 wherein the motor vehicle chassis supports a load container, the auxiliary chassis suspension is adapted to suspend the auxiliary chassis from the load container and thereby from the motor vehicle chassis, and the auxiliary chassis suspension is adapted to stow the auxiliary chassis on the load container.

21. A dual trailing axle suspension system as set forth in claim 1 wherein the motor vehicle chassis supports a tiltable load container, the auxiliary chassis suspension is adapted to suspend the auxiliary chassis from the tiltable load container and thereby from the motor vehicle chassis, and the auxiliary chassis suspension is adapted to stow the auxiliary chassis on the tiltable load container.

* * * * *